July 19, 1966            J. H. FORKNER            3,261,694
METHOD FOR DEHYDRATION OF MOISTURE CONTAINING
MATERIALS OF CELLULAR STRUCTURE
Filed Dec. 6, 1961            4 Sheets-Sheet 1
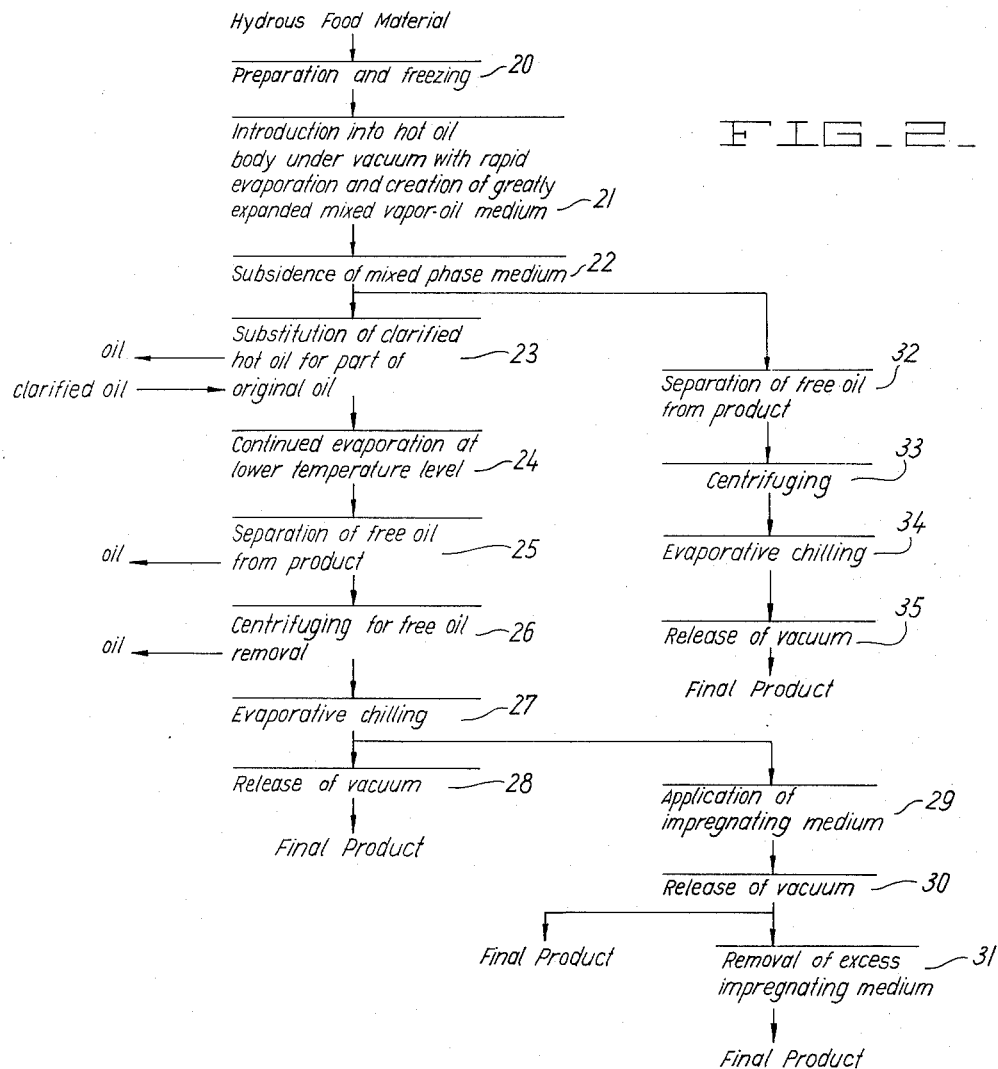
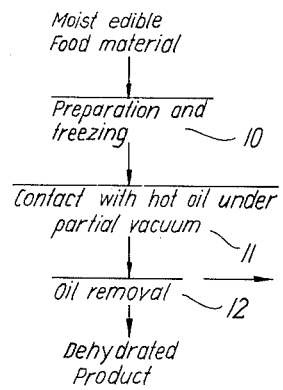
INVENTOR.
John H. Forkner
BY
ATTORNEYS

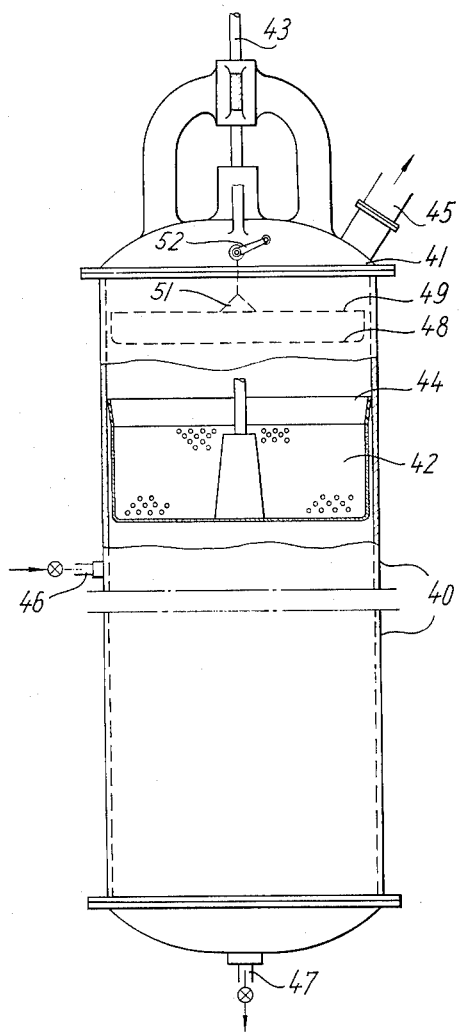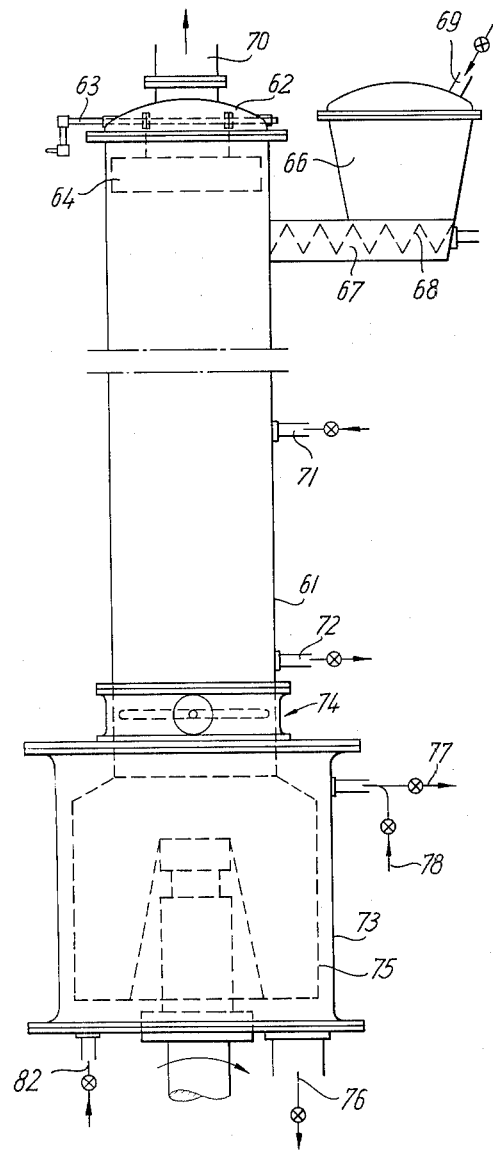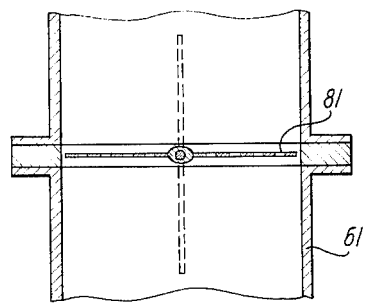

INVENTOR
JOHN H. FORKNER
BY
Flehr and Swain
ATTORNEY

July 19, 1966     J. H. FORKNER     3,261,694
METHOD FOR DEHYDRATION OF MOISTURE CONTAINING
MATERIALS OF CELLULAR STRUCTURE
Filed Dec. 6, 1961     4 Sheets-Sheet 4

INVENTOR
JOHN H. FORKNER
BY
ATTORNEY

United States Patent Office 3,261,694
Patented July 19, 1966

3,261,694
METHOD FOR DEHYDRATION OF MOISTURE CONTAINING MATERIALS OF CELLULAR STRUCTURE
John H. Forkner, Fresno, Calif., assignor to The Pillsbury Company, Minneapolis, Minn., a corporation of Delaware
Filed Dec. 6, 1961, Ser. No. 157,538
15 Claims. (Cl. 99—199)

This application is a continuation-in-part of application Serial No. 79,038, filed December 28, 1960, for Dehydrating Method and Product( now abandoned).

This invention relates generally to methods and apparatus for dehydrating or drying various moist food products, including such materials as fruits, berries, vegetables, nuts, cereals, poultry, meat, fish, moist formulated mixtures of the same, and products fabricated with moist dough.

The commercial advantages of dehydrating various moist food products, particularly preservation and weight economy, are well known. The quality of the final products obtained from various dehydration methods is judged by such factors as general physical appearance, color, flavor, nutritive value, extent of denaturing rehydrating characteristics and keeping properties. In many instances, poor quality is tolerated because of economic reasons. Poor quality generally results from excess heating for prolonged periods of time, which detrimentally affects flavor and other heat sensitive properties, and from oxidation, which deteriorates color, flavor, and nutritive value. Also it results from procedures which cause extensive shrinkage in volume and changes in physical form. In an effort to meet the demand for high quality dehydrated particulate products, vacuum evaporators have been employed which employ processing temperatures of the order of from about 140 to 230° F., under partial vacuums of the order of from 22 to 29 inches mercury column. With such equipment, certain moist food products can be dehydrated without serious impairment of heat sensitive or oxidizable constituents, having reference particularly to food products which do not have a high water content. However, with conventional vacuum dehydration equipment, heat transfer to the material undergoing dehydration is at a relatively slow rate, particularly in instances where the particles have limited contact with each other and for items of high water content, thus greatly extending the period of evaporation. The masses or particles undergoing dehydration are supported in metal trays, and in many instances considerable physical impairment of the articles occurs due to over-heating and burning of the surfaces in contact with the tray, to sticking to the tray due to exuding juices, and to changes in physical form and size. Because of the above and other difficulties, it is generally considered that conventional vacuum dehydration is impractical for fresh particulate fruits and vegetables of high water content.

Freeze drying, which has reference to vacuum drying while the product is frozen, is effective with some materials to produce good dehydrated products. Particular disadvantages of this method are the relatively high costs of equipment required for a given capacity, and high cost per unit weight of material dehydrated. Also, according to my observations, many of the products produced by freeze drying have undesirable properties. For example, many products (e.g. the meat of fowl) are quite friable and tend to break during handling.

A limiting factor of all commercial shelf-type dryers, including vacuum and freeze-driers, is that heat is conducted through a metal surface with which the material is in direct contact. When it is attempted to charge the trays or shelves with a quantity of particles to a depth greater than one layer, much of the material does not have direct heat transfer contact, and heat transfer thru adjacent particles is insufficient for practical operation.

It is known that moist food particles can be dehydrated by immersion in hot oil. When carried out at atmospheric pressure the extended time and temperature factors involved cause undesirable changes in flavor, palatability, color, form and volume. If the oil temperature is increased to shorten the drying time, then serious burning occurs. With a lower oil temperature there is a tendency for the material to cook without substantial evaporation. By application of a partial vacuum the treatment time can be shortened, but if economical charge ratios of product to oil are used, the time required is extended beyond practical limits. Also undesirable physical changes occur, such as excessive shrinkage and handling. Products dehydrated as described above are characterized by lack of rehydratability, which is caused by the amount of oil present and its distribution in the product.

As a modification of the oil dehydration method, it has been proposed to freeze the source material, introduce it into a body of hot oil at a temperature of the order of 180° F. or less, and thereafter apply a partial vacuum to carry out dehydration, with heat being supplied to the oil to maintain the temperature level. While such a process may somewhat improve the quality of some products such as meat, it again is subject to disadvantages as mentioned above, including heat injury, uneconomical charge ratio, prolonged time cycle to complete dehydration, and high residual oil content in the final product.

In general, it is an object of the present invention to provide a new dehydrating method applicable to a wide variety of moist food materials, and which avoids many of the disadvantages of dehydration methods as heretofore practiced.

Another object of the invention is to provide a dehydrating method which is characterized by rapid heat transfer to the articles being dehydrated, without causing injury to the same.

Another object is to provide a method that can be applied to a wide variety of materials, to produce products having a reduced moisture content of a desired value.

Another object is to provide a novel dehydration method which is characterized by rapid heat transfer from hot oil to the item undergoing treatment, a relatively short overall treatment time, and an absence of any substantial burning or impairment of heat sensitive components, whereby the final product is of excellent quality.

Another object is to provide a dehydration method which maintains in the final product the general identity of the form and size of items or particles being treated, even in instances where the original material is soft and of high water content.

Another object is to provide a novel dehydrating method which inhibits physical decomposition of the items or particles being treated, and which minimizes diffusion of sugar, cellulose and other components from the product into the hot oil employed.

Another object is to provide a dehydrating method in which high temperature differentials are employed in conjunction with applied partial vacuum, whereby a new principle of operation is obtained with marked advantages and new results.

Another object is to provide a novel dehydrating method in which the major portion of the moisture content is removed in a short period of time, during which the material being dehydrated is in a hot mixed vapor-liquid phase medium.

Another object is to provide a novel dehydrating method making use of hot oil, in which the items or particles to be dried are pretreated in a particular manner to obtain certain desired properties in the final product.

Another object is to provide a dehydrating method adaptable to food products that have been processed by other methods, such as by sun drying, air drying, vacuum drying, candying, pickling or smoking.

Another object is to provide a dehydrating method making use of hot oil, which can be carried out to produce final products of low residual oil content, and with novel distinguishing characteristics.

Another object is to provide a novel dehydrating method wherein the source material may be pretreated in such a manner as to increase the volume of the final products.

Another object is to provide novel apparatus for carrying out the foregoing method.

Another object is to provide novel high quality dried food products resulting from the foregoing method. In a typical application of my method, the end product is of high quality with respect to color, flavor and nutritive value, and it readily and effectively rehydrates upon contact with water to form a material similar to the original source material.

Another object is to provide novel high quality dehydrated food products characterized by the fact that the individual items or fragments have an outer surface that is readily permeable to vapor and moisture, while the interiors of the individual items are relatively absorptive and porous.

Another object is to provide novel dehydrated food products having a controlled amount of oil therein which is distributed in a particular manner in the tissue, and which contributes to tissue pliability as distinguished from undesirable friability.

Another object is to provide novel high quality dehydrated food products which are impregnated with certain edible materials to enhance their usefulness. Particular reference can be made to dehydrated meat that retains a part of its original fat, and which is impregnated with an added fat.

Additional objects and features of the invention will appear from the following description in which the preferred embodiments have been set forth in detail in conjunction with accompanying drawings.

Referring to the drawings:

FIGURE 1 is a general flow diagram illustrating my method;

FIGURE 2 is a more specific flow diagram showing the method as applied to certain types of food products;

FIGURE 3 is a side elevational view, partly in section, showing apparatus for carrying out my method;

FIGURE 4 is a side elevational view, partly in section, showing another form of apparatus;

FIGURE 5 is a detailed view in section showing another form of means serving to retain material being dehydrated below the surface of the oil.

Figure 6:
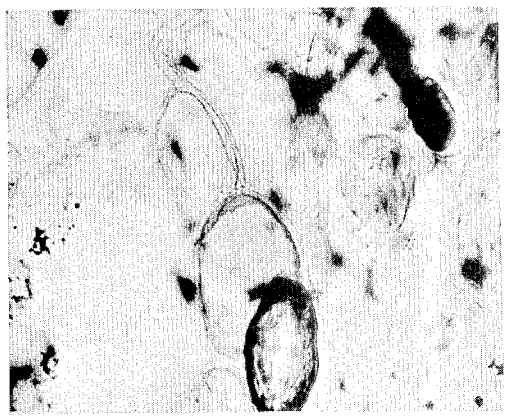

FIGURES 6 to 16, inclusive, are photomicrographs of certain products made in accordance with my invention.

In accordance with the present method, moist food material in particles of suitable size and at a low temperature level, is subjected to treatment under partial vacuum to complete a dehydration cycle, the treatment including dispersion of the particles in a mixed phase medium or foam consisting of water vapor and hot oil. To start the cycle the material can be introduced into a quantity of hot oil under an applied partial vacuum. The temperature of the oil at the time of the initial contact is relatively high compared to the vaporization point of water at the applied partial vacuum, as for example from 240° to 600° F., the range of from 325 to 440° F. being preferred. In a typical instance the material is frozen and is at a temperature level below 32° F. Because of the great temperature differential between the material and the hot oil, a rapid heat exchange takes place whereby the outer surface layer of the product is flash heated to the vaporization point of the hydrous juices present. Immediately the initial phase of the dehydration cycle proceeds at a rapid rate with almost explosive violence. Rapidly evolving vapor forms a mixture of vapor and oil, or what can be termed a foam, of greatly increased volume (e.g. more than three times the normal volume of oil and product), with violent agitation or churning action. The oil temperature drops immediately and rapidly and the evolving vapor creates a high rate of vapor flow to the evacuating means employed. The surfaces of the material and the outer layers through which dehydration progresses, are protected by the rapidly evolving vapor against burning by direct contact with the hot oil. During this initial phase the material is subject to certain conditions which make for novel properties in the final product, as will be presently explained.

After the first initial phase of rapid evaporation, the rate of vapor flow diminishes, the foam subsides, and the level of the oil body returns to near its initial level. Thereafter (assuming that a low moisture content is desired) dehydration is continued at a lower temperature level to complete the cycle. The major part (e.g. 75 to 95%) of the moisture present in the material is removed in the short time (e.g. ½ to 4 minutes depending largely on particle size, moisture content and initial temperature of the particles, ratio of particle weight to weight of oil, and oil temperature) of the first rapid evaporation phase, and the remaining moisture (except for residual) is removed at the lower temperature level. In general the overall time period of treatment in the hot oil, under applied partial vacuum, is relatively short, and may in typical instances be of the order of from 7 to 40 minutes.

When the moisture content of the material has been reduced to the value desired, any one of a number of procedures can be followed, depending on the character of the final product required. One procedure is to break the vacuum after separation of free oil from the product by draining, after which some further oil may be removed by centrifuging. However, for most of the applicable source materials, I prefer to effect a general separation between the free oil and dehydrated material, and then to subject the material to centrifuging, all under partial vacuum, after which the vacuum is broken. Such procedure produces certain novel and desirable properties in the final product.

It may be explained that the product tends to be buoyant at the end of the initial phase and while the vacuum is maintained, but sinks in the oil if the vacuum is released before the oil is removed. Thus separation before the vacuum is broken can be carried out by removing oil from below the floating material, with final depositing of the material on a screen through which oil may drain.

The flow diagram of FIGURE 1 illustrates one procedure for carrying out my method. The moist edible food material to be dehydrated is first subjected to preparatory operations in step 10, the nature of which is dependent upon the material being treated, and the desired character of the final product. In general the preparation or pre-treatment will include cleaning, and when the items are of substantial size, cutting, slicing or otherwise reducing the items to masses or particles of suitable size for processing. Thereafter the material is chilled to produce a free flowing frozen bulk material. Such material can be stored at temperature levels of the order of minus 40 to plus 20° F., until it is introduced into my process. Conventional freezing techniques can be used such as a technique known as "individual quick frozen."

In general it is desirable for the particles to be relatively uniform in size and weight. According to my observations, particles weighing less than about 10 grams are well adapted to my method, and afford a good surface area to weight ratio.

The invention is applicable to various categories of food materials, including fruits and berries, vegetables, condiments, meats, fowl, sea food, cereal grains, dried fruit and formulated products, all of which can be prepared to form chilled particles suitable for processing. A wide variety of fruits can be treated by my method, including peaches, apricots, pineapple, cherries, bananas, grapes, dates, strawberries, blueberries and the like. Vegetables which are applicable include peas, carrots, potatoes, celery, cabbage, bean sprouts, onions, peppers, sweet potatoes, cereals and the like. Meat that are applicable include beef, pork, lamb, processed meats, such as ham, corned beef, cured pork and the like. As to fowl, reference can be made to chicken, turkey, pheasant, duck and the like. As to sea food, reference can be made to shrimp, both fresh and cooked, tuna and other fish such as are commonly marketed, oysters, clams, lobsters, crab and the like. As condiments, reference can be made to mushrooms, water chestnuts, and various spices and herbs.

The larger fruits like peaches, can be peeled, pitted and sliced or cubed into pieces not thicker than about ½ inch. Smaller items such as cherries, blueberries, and grapes can be cleaned and frozen without reduction in size.

Fresh vegetables can be cleaned and prepared by use of conventional procedures such as the employed in the frozen food and canning industries. Blanching can be applied before freezing to minimize enzymatic activity. Multiple perforating or scarifying can be applied before or after freezing to such materials as peas, Chinese pea pods, and the like. Here again where the items are of substantial size, they are reduced to particles (e.g. slices or cubes) of a size suitable for processing.

Meats like beef, pork or lamb can be prepared by cutting and trimming to suitable size, followed by cooking, draining and freezing.

Fowl (e.g. chicken and turkeys, etc.) can be prepared by cleaning and cooking, removal of the flesh from the bone and skin, and cutting into pieces of suitable size, after which the flesh is frozen. Tenderizing treatments can be used, such as low freezing and/or intermediate thawing and refreezing.

Sea food, such as shrimp, cod or other fish flesh, can be prepared by cleaning, cooking and shelling followed by freezing. In some instances cooking may be omitted.

Condiments such as fresh mushrooms, water chestnuts and the like, can be prepared by cleaning and cutting, followed by freezing. Where the source material in this category is in dry form, such as dry mushrooms, they can be cleaned and partially rehydrated before freezing.

As indicated above some source materials may have been processed by other methods. For example materials like cherries may have been subjected to processing to produce a product of the maraschino type. Pork may have been preserved as ham, or beef as corned beef. Materials like cereals, chick peas (garbanzo beans) or Japanese tree mushrooms, may have been air or sun dried, whereby they require rehydration before freezing. Dried fruits like dates, peaches or apples may have been partially dehydrated by air or sun drying. Vegetables like cucumbers may have been preserved by pickling.

Although I prefer to employ the individual quick freeze method to produce a free flowing bulk frozen material, in some instances it is satisfactory to freeze in the form of slabs, provided such slabs quickly fall apart into the individual frozen particles when the slab is immersed in the hot oil.

Assuming that the food material has been prepared and chilled to a temperature level below 32° F. and preferably of the order of −40 to +20° F., which in most instances results in freezing, it is contacted with hot oil in step 11, preferably by depositing a measured charge of the frozen material into a predetermined quantity of hot oil while the oil is being subjected to a partial vacuum.

The amount of frozen material (by weight) introduced into a given amount of hot oil is dependent mainly upon the initial oil temperature, and thus the temperature differential between the chilled or frozen material and the oil. Greater amounts of chilled material can be used with higher oil temperatures. Thus with an initial oil temperature of about 240° F., the proportioning in a typical instance may be four pounds of frozen material (e.g. at 5° F.) for each one hundred pounds of oil, while at initial oil temperatures ranging from 325 to 440° F., the proportions may correspondingly range from about 7 to 30 pounds of chilled material for each one hundred pounds of oil. Introduction of the chilled material into the hot oil, with proportioning of the order just mentioned, serves rapidly to reduce the temperature of the oil from its initial high value, to a lower level of the order from 130 to 230° F. In addition rapidly evolving vapor intermixes with the oil to create a mixed vapor-liquid phase medium or foam having a volume much greater than the original body of oil. This medium envelops the material undergoing dehydration, and the material is caused to be dispersed throughout the expanded space which the medium occupies. The rapid drop in oil temperature takes place due to rapid evaporation of moisture, which results from the high rate of heat transfer from the mixed phase medium to the food material. The extent of oil temperature drop is determined by the amount of sensible heat consumed in vaporizing moisture.

As previously mentioned, at the end of the initial phase, which is characterized by creation of a mixed vapor-oil medium, the medium or foam subsides, and thereafter the cycle is continued at a lower temperature level to attain a desired low moisture content. At the end of the dehydration cycle, the resulting products are separated in step 12 from free oil. This is carried out while application of partial vacuum is continued, as by separating oil from the buoyant material followed by depositing the material on a screen through which oil may drain. Thereafter the vacuum is released and the product removed from the treatment chamber. This procedure serves to produce final products having a substantial amount of oil content derived from the process as, for example, an oil content they may range from 50 to 60% (dry solids basis). Such oil content can be somewhat reduced by centrifuging while the material being treated is at a temperature level above the melting point of the oil (e.g. 120 to 140° F.), whereby the oil readily leaves the pores of the dehydrated product. With this procedure, products can be obtained having oil contents that may range in a typical instance from about 40 to 50% (dry solids basis).

Some variations in the method are experienced with variations in the moisture content of the source material, and variations in the size of the particles. In general for materials of lower moisture content, the proportionate amount of the charge can be increased to obtain the same temperature drop within the same time interval. In general the amount of charge (by weight) for a given amount of oil and for a given initial oil temperature, should be such as will immediately drop the oil temperature over a short period (e.g. ½ to 4 minutes) to a temperature level of the order of 130 to 230° F., and during which period defrosting of frozen material occurs.

An initial frozen condition of the material provides a number of desirable features. Particularly it provides a physical rigidity for the separate particles introduced into the hot oil, even though the moisture content may be high. This makes it possible more readily to handle and charge a bulk mass into a body of hot oil without breakage or bruising. Also it makes it possible for each individual frozen particle to have heat transfer relationship with the surrounding hot oil, with uniform evaporation from all its exposed surfaces. During the initial phase of rapid evaporation, thawing occurs concomitant with evaporation. Thawing and evaporation start at the outer layer and progress inwardly. Thus during the initial phase of evaporation a rapidly diminishing frozen core remains to impart rigidity and to aid in maintaining the original physical form. Probably evaporation does not take place directly from the frozen state, but only after some thawing occurs. Therefore the rate of thawing serves as a regulating factor on the rate of evaporation. Also the receeding frozen core maintains a part of the mass rigid and cold while thawing and evaporation proceed. Thawing or defrosting of the particles is complete within the time of the rapid initial phase of evaporation.

Initial rapid evaporation from the outer layer, progressing inwardly, involves rapid outward flow of vapor, which tends to prevent an over-all collapsing or excessive shrinkage of the particles as evaporation proceeds.

Although evolved vapor flows rapidly through the outer layer of the particles with inflation of tissue, as moisture evaporation progresses inwardly the tissue is not disintegrated and it remains in the particle without material spacial re-orientation. The extent to which the tissue may be disrupted or is altered is dependent upon the source material. The soft, sponge-like tissue found in succulent vegetables like celery is altered to a substantially extent, whereas the cell tissue of a material like cooked beef is not materially altered. Because evaporation takes place in the outer layer of each particle before evaporation has proceeded to the central region, some stiffening of the outer tissue tends to occur before the frozen core has disappeared, and such stiffer outer layer serves to maintain the general form of the particle, and to retain inner tissue within the space defined by the outer layer. The outer layer remains pervious to evolving super heated water vapor, and does not form a matted and relatively impervious skin. Such a surface skin, which is commonly experienced in other dehydrating methods and is referred to as case hardening, is objectionable for many reasons, including the fact that it forms a heat insulating and moisture barrier, which impedes heat transfer and moisture evolution, and in the final product modifies the physical appearance and interferes with rehydration.

The freezing temperature of various hydrous food products varies somewhat depending upon the character of the hydrous juices. In general most hydrous food materials such as are applicable to my process can be frozen at temperatures within the range of 0 to 24° F. Treating of food materials before dehydration, such as by pre-drying or by adding sugar, serves to increase the solids content and to lower the freezing point to temperatures that in some instances may be below 0° F. Particular reference can be made to sun dried dates or glaced cherries. It is common practice in the frozen food industry to freeze to a temperature of about −20° F., and thereafter to store at temperatures well below freezing, such as from −40 to 20° F. I can follow the same procedure, whereby the material is within this temperature range when taken out of storage, and does not materially increase its temperature before being contacted with the hot oil. While freezing has certain advantages, materials having low freezing points can be chilled to a temperature level below 32° F. without freezing. Such chilling provides a high temperature differential to promote rapid heat transfer. The natural firmness and stability of such materials tends to protect them against injury.

Slow freezing or thawing and refreezing can be employed to tenderize materials, such as meat, fowl and fish.

In instances where high oil temperatures are employed (e.g. 400–600° F.) the material can be chilled to very low temperatures (e.g. −40 to −60° F.), as by Dry Ice or other refrigerant, immediately before introduction into the oil. Under such conditions the initial rate of heat transfer is accelerated. This procedure can be used to advantage with materials of very low solids content (e.g. celery) where it is desired to remove the moisture as quickly as possible.

Although the vaporiaztion point of moisture in most moist food materials is well below 130° F. under a partial vacuum of the order from 22 to 29 inches mercury column, it is desirable to carry out the process whereby the oil temperature does not fall below that figure. The temperature level to which the oil falls in the first phase of rapid heat exchange is determined largely by the initial oil temperature, the temperature of the frozen material, the ratio between the weight of the material and the weight of the oil, the degree of partial vacuum maintained before and after introduction of the charge and the initial moisture content and size of the material. Preferably the thermal equilibrium is such that the initial rapid drop in oil temperature does not go below about 130° F., and whereby thereafter (presuming that a moisture content of the order of ½ to 5% is desired in the final product) a temperature level is maintained which may be from 170 to 230° F. (195° F. optimum) for the remainder of the cycle. In exceptional instances temperatures higher than the range just specified can be maintained (e.g. up to 240° F.) where some browning is not objectionable (e.g. fish meat). Depending upon the extent of temperature drop which tends to take place in the initial phase, some heat may be supplied to the oil to insure a proper temperature level for the remainder of the cycle. Thus heat may be applied during the initial phase, as by steam jacketing the tank or vessel containing the oil and charge, with the result that the extent of the temperature drop is reduced. Such heating may be continued after the initial phase to bring the temperature to a desired level. Another procedure is to impart heat by circulating oil through an external heat exchanger. The preferred procedure is to withdraw some of the initial oil at or near the end of the initial phase, and reintroduce a fresh hot oil at a temperature such that the resulting temperature of the oil body is at the level desired for the remainder of the cycle. The advantages of the last described procedure will be presently explained.

The immediate and rapid temperature drop in the initial phase limits the time during which the particles of material are associated with oil at a temperature normally in the burning range. Also for the limited time of such association the oil is in the form of a foam, and therefore does not have the burning effect of a denser liquid phase body at the same temperature. The rest of the cycle, which requires more time retention, and which is carried out with the material in direct contact with the oil at its normal or near normal density, is at a lower temperature level to avoid burning. In typical instances the outgoing temperature of the oil may be about 195° F.

Tests have been made which confirm the advantages and new results obtained by introducing the moist food material into the hot oil in chilled condition and under a partial vacuum. With conditions being the same, when the source material is introduced at ambient temperature there is noticeable physical injury to the product, such as discoloration, burning, disintegration of the cell structure, varying degrees of disintegration or dissolving into the oil and collapsing of volume. The magnitude of these effects is dependent largely upon the oil temperatures and the character of the source material. Initial high oil temperatures, comparable to temperatures used in my method, cannot be employed, thus necessitating lower temperature levels and extended time cycle. When the moist food material is chilled and frozen, and is introduced into the oil while the charge and oil are under a partial vacuum, the method is altered and the quality of the end product is greatly improved. Under proper conditions, discoloration and burning can be completely eliminated, and these desirable results obtained with a cycle that is practical and relatively efficient. Contrary to what might be expected, chilling actually increases the rate of moisture removal, other conditions remaining the same. Thus in one series of tests, one batch of fresh unfrozen peaches were reduced to 50% moisture in 10 minutes, but when frozen and subjected to the same conditions of initial oil temperature and partial vacuum (by my method) the moisture content was reduced to about 50% in 5 minutes, and to 29% in 10 minutes.

These results cannot be adequately explained but are attributed to better heat transfer due to the greater difference between the temperatures of the oil and the material, to better regulation of evaporation from the chilled and frozen material, and to the fact that the surface tissue did not collapse to form a heat insulating skin.

In conventional evaporation, moisture is removed from the surface by evaporation, with the result that there is a continual redistribution of moisture content, with a continuous concentration of the aqueous juices. With my method, and assuming that the material is frozen, there is substantially instantaneous conversion of ice to the vapor phase (probably with momentary transition through the liquid phase), and therefore such redistribution of juices does not occur. Also in my method there is little opportunity for the cell structure or tissue to be wetted with juices in the liquid phase.

Within the hot oil and particularly during the initial period, the particles should be unrestrained. As previously mentioned, rapid removal of water vapor is accompanied by creation of a mixed phase foam (i.e. water vapor-oil mixture) which envelops the particles, and by relatively violent agitation or churning action of this medium which maintains the particles in motion and distributed in the body of foam, and in general contributes to good heat transfer.

By use of known types of evacuating and vapor condensing equipment (e.g. water spray condenser and a mechanical or ejector type pump) it is practical to maintain partial vacuums of the order of 22 to 29 inches mercury column. Assuming the initial vacuum is of the order of 26 to 28 inches mercury column, immediately after the charge of frozen material is introduced into the hot oil, the rate of vapor flow from the resulting foam may be such as to somewhat tax the capacity of the evacuating means. In such event the partial vacuum may momentarily be reduced as for example to 25 inches mercury column. Such a reduction in vacuum reduces the load in the condenser and also serves the purpose of preventing such rapid vapor flow as might carry over excessive amounts of oil into the condensing equipment. Toward the end of the initial phase, and for the following part of the cycle, higher vacuums, such as 27 to 29 inches, can be applied and maintained. In practice, in the operation of commercial equipment. the applied vacuum can be progressively increased as the moisture content of the material is reduced.

As previously mentioned, for the initial phase of the method (e.g. first ½ to 4 minutes), during which rapid evaporation takes place, the material is enveloped in a mixed phase (i.e. water vapor-oil) medium of greatly increased volume and the oil temperature is rapidly reduced. During this phase a major part of the original moisture content is removed (e.g. from 50 to 95%, optimum 75–90%). In some instances products are desired having a residual moisture content of the order of from 15 to 30%. For such products and assuming that they are sufficiently firm, the dehydrating cycle can be terminated after the desired moisture content has been reached, which may be shortly after or at the end of the initial phase. Evaporative cooling can be applied to such products as described above. Also centrifuging can be applied as described above or preferably under vacuum as hereinafter described.

The period of time required to produce dehydrated food products having a low moisture content ranging from about ½ to 5% is dependent upon a number of factors, including the character of the source material, pre-treatment of the material, the initial oil temperature in step 11, the amount of the source material in proportion to the amount of oil (by weight), and the temperature to which the source material is chilled, and the value of the applied vacuum. However, for a wide variety of moist frozen food materials, and with temperatures and vacuums of the order previously mentioned, the time period of treatment to produce moisture contents of the order of 1 to 5% will be of the order of from 7 to 40 minutes, the optimum time being from 10 to 25 minutes.

Instead of following the procedure previously described for removal of free oil at the end of the cycle, I prefer to drain free oil from the product and thereafter centrifuge the product, all while the application of a partial vacuum is being maintained. By this procedure products can be obtained having oil contents of the order of from 20 to 40% (dry solids basis) having reference to oil content derived from the process. As will be subsequently explained in greater detail, this procedure also provides novel products having distinctive characteristics. Having reference particularly to the manner in which the oil content is controlled and is distributed in the product, certain advantages are obtained by an oil content so distributed at the level indicated, and certain disadvantages obtained by the previously described procedure, are avoided.

A wide variety of oils and fats can be used. For example, I can employ various oils and fats of vegetable or animal origin. As examples of vegetable oil, reference can be made to corn, cotton seed, rice bran, soy, olive, peanut, coconut, sesame, tomato seed and the like. As examples of animal oil reference can be made to fish oil, beef tallow, lard, butter oil, and the like. Generally it is desirable to use oils or fats which have been refined to the point where they do not impart any undesirable odor or flavor to the product. The so-called hydrogenated oils have been used with good results, such as hydrogenated shortening fats. In general the higher melting point oils, such as cotton seed flakes (melting point about 150° F.) tend to be retained to a lesser degree by the final product.

In addition to the oils and fats referred to above, I can employ for some products edible waxes that are stable liquids at temperatures of the order employed in my method. For example, natural or refined beeswax has been used with good results. Such a wax can be blended in various amounts with a suitable oil or fat, thereby modifying certain physical characteristics of the oil. Particularly introduction of the wax raises the melting point of the oil and increases its viscosity. Also it provides a medium which is more stable and therefore better adapted for reuse, which can be more readily filtered to remove solids, and which tends to be absorbed to a lesser extent by the product. Greater stability of the blended oil tends to increase shelf life and to better protect the product against atmospheric moisture. Another example is Jojoba wax, which can be blended with oil (e.g. hydrogenated shortening), and which likewise modifies the oil by increasing the melting point, lowering the smoking point, and making the oil more stable and better adapted for repeated reuse.

In explanation of the appended claims, the term oil as used therein is intended to include oils, fats and waxes (all of which are esters of fatty acids) and blends thereof, with or without hydrogenation, decolorizing, deodorizing or other refining. Also it includes materials having characteristics like oils and fats, which are edible, and which have sufficient stability to withstand the conditions to which they are subjected in my method.

Preferably the oil has a melting point above atmospheric temperature, as for example from 102 to 150° F. Flavor containing oils, such as butter oil or natural animal fats (e.g. chicken fat) may in some instances be used to impart a desired flavoring. Special flavoring ingredients can be inserted in the oil, with retention of some such flavoring in material undergoing treatment. At temperature levels ranging up to 440° F., and with an applied partial vacuum, the more prominent vegetable and animal oils are not subject to serious breakdown or changes in their molecular structure. Certain oils are sufficiently stable for commercial use at temperatures ranging up to about 600° F., in vacuum.

In general it is preferable to use the highest temperature level that is consistent with the stability of the oil being used, the character of the material being dehydrated, and the equipment employed. As previously mentioned, a high initial oil temperature provides a high temperature differential between the oil and the chilled moist material to be dehydrated, thus making for very rapid and efficient heat exchange. Also it makes possible high charge ratios, or in other words, a relatively large amount of chilled material can be introduced into a given amount of oil, thus providing good production capacity and a relatively short dehydrating cycle. In addition to the foregoing, the use of a high temperature differential appears to bring about desirable properties in the final product. It is deemed practical and desirable in some instances to use oil temperatures ranging as high as 600° F., while under vacuum, provided the oil is sufficiently stable and the apparatus such as to permit adequate control. A preferred range for the initial oil temperature is from 325 to 440° F., about 400° F., being deemed optimum.

While the method is not critical with respect to the type of oil employed, it is desirable in some instances to select an oil having a natural relationship to the particular product being treated, and whereby the oil remaining in the final dehydrated product can be considered a natural additive. For example in the dehydration of pork, I can employ lard with or without hydrogenation. Also I can employ beef tallow for beef, and chicken fat for chicken. Natural fish oil can be used for the dehydration of fish, coconut oil for fresh coconut, olive oil for processed olives, tomato seed oil for tomatoes, and corn oil and other appropriate cereal oil for cereals. For the dehydration of meat, I have found that it is desirable to use fat selected from the regions of the internal organs, which is known to be somewhat harder than fat near the skin.

Depending upon the particular food material being treated, constituents from the material find their way into the oil. Thus at the end of the cycle the oil may have accumulated such constituents as sugar, farinaceous material like starch, coloring matter, cellulose fiber and skin material. Such materials can be removed from the oil by known methods, such as sedimentation, centrifuging and filtration, thus producing a clarified oil in condition for reuse.

For economical reasons, reuse of the oil is generally of importance. Suitability for reuse is dependent upon the stability of the oil under the conditions to which it is subjected, and the ease with which the oil can be conditioned for reuse.

The properties of the end product, particularly color and flavor, may be affected by divided solids accumulated in the oil. To avoid or minimize the detrimental effects of such accumulated solids, I prefer during the cycle to substitute hot clarified oil for some part of the initial contaminated oil. The hot clarified oil can be at a temperature such as to effect a heat exchange as previously described, thereby raising the temperature of the body of oil to a desired level for the remainder of the cycle. The amount of such substitution can be varied according to requirements. As the substitution approaches 100 percent, the product during the rest of the cycle is less affffected by any characteristics of the original oil acquired in the initial phase. The oil substituted for original oil may be fresh oil that has been heated and deaerated, or oil used in a previous operation that has been clarified as by settlement, centrifuging and filtration, and heated and deaerated. With or without an oil substitution at or near the end of the initial phase of the cycle, all or a part of the body of oil used after the initial part of the cycle can be removed before the cycle is completed, and another oil substituted. Here again the temperature of the introduced oil should be such as to provide a desired temperature for the entire body of oil. Such oil may not need to have the temperature stability of the first oil used. It may be selected to impart desired properties to the final product, such as flavor, etc.

At the end of the vacuum centrifuging operation described above and before the vacuum is released, various materials may be applied to the product and thereafter the vacuum released. This results in penetration of the applied material into the pores of the product. Liquid impregnating ingredients which can be applied in this fashion include liquids containing flavoring, vitamins and the like. Thus it is feasible before releasing the vacuum at the end of centrifuging to immerse the product in the centrifuge in a liquid treating medium. Upon breaking the vacuum, the liquid is forced into the pores of the product, thus providing good penetration. Thereafter the product can be subjected to draining and centrifuging for the removal of free impregnating liquid. The liquid impregnating ingredients which can be applied in this fashion include oils or fats, aqueous liquids containing flavoring ingredients, alcoholic liquors, concentrated sugar syrups, preservatives, tenderizing enzymes, stabilizers and the like. One example is the impregnation of dehydrated chicken flesh with chicken fat, gelatin solution, or both.

In addition to the impregnating ingredients referred to above, it is possible to utilize liquid solvents, applied by spray or by immersion of the material after cenrifuging in the vacuum, and before the vacuum has been released. Thereafter release of the vacuum serves to cause the liquid solvent to penetrate the pores of the product. A solvent can thus be used as a medium for introducing certain ingredients into the product, such as certain vitamins and enzymes. Thereafter excess solvent can be removed by centrifuging and/or evaporation.

Materials in the vapor phase also can be applied to the final product before the vacuum is broken, such as aromatic flavoring. Thus if a seasoning vapor is introduced into the space occupied by the centrifuge basket at or near the end of the centrifuge operation, but before rotation of the basket has terminated and before or during breaking of the vacuum, some aromatic or volatile flavoring ingredients can be caused to penetrate the pores. Instead of a vapor, atomized or spray droplets of a normally liquid seasoning can be applied in the same manner.

A characteristic of my method is that it carries out evaporation in the absence of atmospheric oxygen. Therefore oxidation of constituents of the food material is maintained at a minimum. To inhibit oxidation during storage, I may in some instances introduce one or more anti-oxidants into the treatment oil, whereby any small amount of oxidation tending to occur during evaporation is inhibited. Assuming that such anti-oxidants are used in the last processing oil, then such inhibiting action is continued by presence of some residual oil in the final product.

In the more detailed flow diagram of FIGURE 2, the moist food material, after preparation and freezing in step 20, is deaerated by subjecting it to a partial vacuum, and then a charge of this material is introduced into a body of hot oil in step 21, the oil likewise being maintained under a partial vacuum at the time of introduction and throughout the cycle. As previously explained, in this initial phase of the cycle a mixed vapor-oil medium is created in which the particles are dispersed, this medium being subjected to agitation and being of a volume much greater than the original body of hot oil. The mixed phase medium or foam subsides toward the end of step 21, as indicated in step 22. In step 23 a part of the first hot oil is removed from the material and a second clarified hot oil substituted which is at a lower temperature level, such that the entire body of oil after the substitution is at a temperature level suitable for the remainder of the cycle. Dehydration proceeds in step 24 until it is completed. In step 25 free oil is drained from the product while the vacuum is maintained, and the product is centrifuged in step 26 while maintaining the vacuum. In step 27 the product is subjected to evaporative chilling.

By evaporative chilling I have reference to a drop in temperature of the product due to removal of sensible heat to supply heat of vaporization of moisture within the material. Such cooling takes place to some extent immediately after the product has been removed from heat exchange contact with the oil. Preferably it is intensified by increasing the applied vacuum (i.e. further reducing the pressure) for a short interval. For example where the applied vacuum for the preceding steps has been of the order of 25 to 29 inches mercury column, the higher vacuum can be of the order of 29 to 29¾ inches mercury column for a period of the order of 30 to 60 seconds, to reduce the temperature of the product to a level below about 130° F., and preferably below the melting point of the retained oil present. In step 28 the vacuum is broken and the product removed. Step 29 represents application of an impregnating medium to the centrifuged material before the vacuum is released after which the vacuum is released in step 30, to cause the impregnating medium to penetrate the material. The resulting final product is one which has been impregnated with a material other than the oil used in processing. Excess free impregnating medium such as a liquid, may be removed by draining, drying or further centrifuging, in step 31.

In the event the oil tends to solidify prematurely, during centrifuging, due to evaporative cooling, the applied vacuum can be reduced during this step, as for example from 28 to 24 inches mercury column.

Where a product of higher moisture content is desired, step 22 can be followed by removal of free oil in step 32, centrifuging under vacuum in step 33, evaporative chilling in step 34, and release of vacuum in step 35 to produce a final product.

Another procedure for cooling before the vacuum is broken is to introduce a measured amount of water into the evacuated space in which the product is disposed after the free oil has been removed therefrom. The amount of such water may, for example, be from 0 to 100% of the weight of the final dehydrated product. Such water immediately flashes into superheated steam, and the steam flows to the condensing equipment without increasing the moisture content of the product. The heat of vaporization of the water is taken from the walls of the equipment in which the product is disposed, and from the product itself. Therefore it serves to reduce the temperature of such metal parts of the equipment as are in proximity to the product (e.g. centrifuge basket and adjacent walls), and the outgoing temperature of the product. A lower outgoing temperature generally results in greater rigidity of the product and greater volume after the vacuum is broken. Cooling as just described can be applied at or near the end of centrifuging, and with or without application of a higher vacuum as previously described.

FIGURE 3 illustrates a simple apparatus which can be used for carrying out the process. It consists of a kettle or a tank 40 of substantial height which is provided with a removable cover 41, and an internal perforated basket 42. The basket is shown attached to the lower end of the rod 43, which rotatably and slideably extends through the cover. The upper lip of the basket is shown provided with a collar 44 that can be made of resilient synthetic material. Conduit 45 connects the tank to suitable condensing and vacuum pumping means. Pipes 46 and 47 are for the introduction and removal of oil charges. These pipes connect with external oil storage tanks and heat exchange means. Also the external equipment may include oil clarifying means, such as a centrifuge, for removing contained solids, and a clarifying filter. The tank may be provided with steam jacketing (not shown) for direct heating.

Within the tank 40 it is desirable to provide means for depressing particles below the surface of the oil during the lower temperature second phase of the cycle, because at that time the buoyant particles tend to float as a thick mat upon the surface of the oil, thus raising some particles above the oil line. Thus a perforated barrier screen 48, having a raised perforated rim, is adjustably suspended in the tank by suitable means such as the cables 51 which are wound or unwound by turning the winch crank 52.

The apparatus shown in FIGURE 3 is operated as follows. The cover 41 is removed, and a charge of frozen material introduced into the centrifuge basket 42. A quantity of oil at its upper temperature level is introduced into the lower portion of the tank. The centrifuge basket is now introduced into the upper part of the tank, together with the screen 48, and the cover applied. The interior of the tank is evacuated to a relatively high vacuum of the order of 28 to 29 inches mercury column. At this time the oil occupies a minor portion of the tank space, as for example the lower one-eighth part. After a short holding period, during which time the frozen material is deaerated, the basket 42 is lowered to the bottom of the tank, thus introducing the frozen material into the oil, and releasing the particles for free movement. A mixed phase vapor-oil medium is immediately created, the surface level of which rises to several times the original height of the oil body, and this is accompanied by rapid flow of vapor through the conduit 45 to the evacuating means. When the oil subsides near the end of the first phase, there is a tendency for the buoyant particles to float as a mat at the surface of the oil. Screen 48 is employed at this time to maintain the particles immersed, and it is positioned at a level whereby its horizontal portion is below the oil level while the rim 49 extends above the oil level. This serves to maintain the particles immersed, thus insuring good contact of the individual particles with the oil. Rim 49 prevents particles from passing up around the edges of the screen to the upper side. As previously described, a part of the first oil can be removed from the tank at the end of the first phase of the cycle, and another hot oil substituted. At the end of the dehydrating cycle, the product is removed from the oil by raising the centrifuge basket, or by removing oil through the pipe 47. After draining off free oil, and while the vacuum is maintained, the basket 42 is rotated whereby additional oil is removed from the surfaces and the porous interiors of the product, by centrifugal force. After or near the end of such centrifuging the vacuum may be increased for effective evaporative cooling, after which the vacuum is released and the cover 41 removed to remove the product.

The apparatus shown in FIGURE 4 can be used for carrying out the method outlined in FIGURE 2. It has a different arrangement for introducing and removing the charge of material. This apparatus consists of a tank 61 of substantial height, in proportion to its diameter (e.g. a height 10 times its diameter). The cover 62 is provided with a winch 63 as in FIGURE 3, which serves to raise or lower the barrier screen 64, corresponding to the screen 48 of FIGURE 3. A charging container 66 is located outside of tank 61 and is connected through one side of the tank by the feed screw housing 67, which contains the feed screw 68. The container 66 is shown connected to evacuating means by line 69.

The tank 61 is connected with vapor condensing and evacuating means by pipe 70. Pipes 71 and 72 are shown for the introduction and removed of oil. The lower end of tank 61 communicates with a removable housing 73 through the valve means 74, which may be of the butterfly type. Housing 73 encloses a perforated centrifuge basket 75 which is adapted to rotate the product. The lower portion of housing 73 is provided with a pipe connection 76 for delivering oil to an oil storage and recovery system. Also the housing 73 is connected by pipe 77 to evacuating means. Opening of pipe 78 permits atmospheric air or other gas to enter the housing 73 at the end of the cycle.

The apparatus of FIGURE 4 can be operated as follows. The charge of the chilled material to be dehydrated is introduced into the container 66. With the butterfly valve 74 closed, the initial quantity of the hot oil is placed in the lower portion of tank 61. Pipe 70 is connected to condensing and evacuating means as previously described. Before the cycle is commenced, the frozen product is subjected to a partial vacuum and thereby deaerated. Likewise the partial vacuum is being applied to the tank 61. Feed screw 68 is then placed in operation to deliver the charge into the tank 61. Because the material is delivered at a substantially even rate into the upper part of tank 61, it continually drops downwardly into the lower portion of the tank to contact the hot oil. Preferably the introduction of the frozen material occurs over an appreciable interval of time such as from 7 to 30 second. Immediately upon first contact of the frozen material with the body of hot oil, rapid heat transfer takes place with rapid evacuation. The rate of vapor evaporation is so rapid that it creates with the oil a foam like medium comprising an explained mixture of vapor and liquid oil which rises in the tank as a column extending above the surface of the oil body. At the time or shortly after the introduction of the charge has been completed, substantially all of the oil is in such mixed phase, or, in other words, substantially no oil remains as a liquid body above the valve 74. The tank should be of sufficient height whereby the mixed vapor-oil medium does not extend into the pipe 70. In a typical instance, the height of this column may be from 6 to 10 times the original height of the oil body. During continual introduction of the charge of frozen material, the frozen particles drop down through the mixed phase vapor-oil column. This serves to keep the foam column and vapor flow rate under control, without developing a column of undue height or a vapor flow rate which cannot be handled by the condenser. The water vapor-oil mixture is cooled by contact with the incoming frozen material, and the vapor passing to the condenser is caused to be at a lower temperature level. Also introducing the material over a predetermined charging period provides a reduced product to oil ratio at the beginning of the cycle. The feature just described makes possible economical ratios between the weight of charge and the weight of the oil employed, because it maintains the development of a foam column and evolution of vapor under control during the first part of the cycle, at which time evolution of moisture, creation of foam and vapor flow tend to be particularly violent.

As previously described the initial phase is accompanied by a rapid drop in oil temperature. When the column of mixed vapor-oil medium subsides, the screen 64 is lowered as with the apparatus of FIGURE 3, whereby the remainder of the cycle is carried out with all of the material maintained immersed in the oil. At this time a part of the oil can be removed and clarified hot oil substituted, as with the apparatus of FIGURE 3. When the product has approached the moisture content desired butterfly valve 74 is opened to deliver the oil and dehydrated material into the housing 73 and the perforated basket 75. At that time the housing 73 is under the same partial vacuum as that applied to the tank 61. Oil is now removed from the housing 73 through pipe 76, including oil that drains from the product. The basket 75 is now rotated whereby some remaining free oil is removed. At or near the end of this centrifuging operation the partial vacuum applied to housing 73 can be increased. For example, where the partial vacuum has been of the order of 27 to 28½ inches mercury column, the vacuum is increased in housing 73 to a value of the order of 29 to 29¾. This serves to remove some additional moisture from the product, and this is accompanied by evaporative cooling of the product. Assuming use of a normally solid oil, evaporative cooling preferably is employed to reduce the temperature of the product to a value below the melting point of the oil, thus causing remaining oil to congeal before the vacuum is broken. Application of a high vacuum at the end of the cycle has a further desirable effect in that it tends to expand the cell or tissue structure immediately before cooling has proceeded to the extent of handling or setting the tissue and congealing the oil, thereby retaining an optimum volume. Pipe 82 is provided for introducing cooling water at the end of the cycle, as previously described.

As an alternative to the mode of operation just described, valve 74 can be in open position during the cycle, in which event housing 73 is in effect a part of the treatment tank. Valve 74 can be closed at the end of the cycle and after substantially all or most of the free oil has been removed. The smaller isolated housing 73 facilitates application of a higher vacuum.

After the cycle has been completed as described above, pipe 78 is opened to admit dehumidified air or other gas at atmospheric pressure to the housing 73, after which the housing is detached and the product removed. Instead of admitting atmospheric air, it is desirable to employ cool gas that has been dehumidified, whereby no appreciable amount of moisture from the gas is reintroduced into the product. Instead of using air, I can employ inert anhydrous gases, such as nitrogen, which serve to fill the pores with an inert gas, thus excluding oxygen. Also the use of sterile air or other gas is desirable, particularly in instances where it is desired to avoid any contamination by introduction of airborne microorganisms (e.g. bacteria or molds). Active gases can be employed (e.g. ethylene oxide) to kill or inhibit such microorganisms. Application of a treatment gas to break the vacuum is particularly effective because the porous product at that time has a minimum amount of absorbed and occluded gas, and in the process of breaking the vacuum the gas is caused effectively to penetrate into the pores or cells of the product.

In FIGURE 4 the barrier screen 64 is vertically moveable as in FIGURE 3. Another arrangement is shown in FIGURE 5. In this instance a rotary screen 81 is provided in tank 61, and is located at a fixed elevation above the valve 74. In the position shown in dotted lines, the screen permits free movement of material. However when turned 90° to the position shown in solid lines, it functions as a foraminous barrier. During the initial phase of the cycle the screen 81 is positioned as shown in dotted lines. At the end of this initial phase the foam subsides and the dehydrated material is buoyant. Some oil is withdrawn through pipe 72 whereby the oil level and the buoyant material are lowered to below screen 81. Screen 81 is now turned to the position shown in solid lines, after which hot oil is introduced into the tank to bring the oil level above the screen. The cycle is then continued, with the particles of material being held below the surface of the oil by the screen.

The initial phase of the method is affected by the value of the partial vacuum maintained, having reference particularly to the rate with which vapor is evolved and the volume of the mixed phase medium. By way of example, with equipment comparable to that in FIGURE 4, having a tank 48 inches in diameter, and about 40 feet in height, the initial charge of oil may provide a liquid level about 4 feet from the bottom end of the tank. Taking fresh celery having a solids content of about 10%, cut into sizes ⅜ of an inch thick, and frozen at 0° F., about 300 pounds of charge may be introduced into about 3,000 pounds of oil at 400° F. over a period of about 7 seconds. Under such conditions, with maintenance of an initial partial vacuum of 24 inches mercury column a mixture of vapor-oil medium is created immediately after introduction of the charge which has a volume about three times the volume of the liquid. However, with a partial vacuum of 25 inches mercury column, the medium has a volume about four times the volume of the oil charge. Likewise with partial vacuums of 26, 27 and 28 inches mercury column, the corresponding volumes are 5 times, 6 to 7 times, and 8 to 9 times the original volume, respectively. For 29 inches the volume of the medium is of the order of 10 or more times the original volume. It will be evident from these figures that the partial vacuum maintained during the initial phase of evaporation, during which time the major part of the moisture is removed, can be adjusted for desired conditions and in accordance with the particular equipment employed, whereby the desired rapid evaporation takes place, but the mixed phase medium is not of such volume as to cause a serious carry-over of foam into the condensing and evacuating equipment. In accordance with my observations in general an initial partial vacuum of the order of 25 to 28 inches of mercury can be employed at the time the charge is introduced into the oil, and thereafter there may be a reduction in the partial vacuum to about 22–25 inches, but with a return to about 28 inches or higher after the first few minutes of operation.

In general both initial oil temperature and the value of the applied vacuum are factors that affect the rate of initial evaporation. Thus evaporation rates greater than those previously mentioned can be obtained by maintaining relatively high vacuums (e.g. greater than 29 inches) at high temperature levels. Thus by way of example, I can attain rates which effect removal of the major portion of the moisture in periods of the order of 15 to 120 seconds.

Various packaging procedures can be employed for storage and marketing. In general conventional packaging procedures can be employed such as used for conventional dried food products, including enclosure in carton, plastic and foil bags, metal cans, glass containers and the like. In some instances where exposure to the atmosphere results in undesirable deterioration, the packaging may be in hermetically sealed containers, such as sealed tin cans or glass jars. Packaging with a treatment gas can be employed to inhibit oxidation. Thus the vacuum at the end of the dehydrating cycle can be broken with sterile anhydrous nitrogen, and thereafter the products packaged in the same gas. When sterilization in the package is important aseptic canning or packaging can be employed, wherein the product in sterile condition is introduced into sterile cans, and the cans sealed under sterile conditions.

When the products have a substantial moisture content (e.g., 10 to 30% on oil free solids basis) they may be stored in frozen condition, or under refrigeration, with or without packaging. If desired preservatives, such as mold inhibitors, can be used to treat such products.

As previously stated, dehydration of most moist food materials by the more common conventional methods results in a considerable shrinkage in volume. With my process, as applied to the treatment of most materials, the end product has a volume and form similar to or not greatly different from the source material. I attribute this in part to the inflating action of the vapor in the initial phase of rapid evaporation, which leaves the overall structure of the particle generally the same. Also it is attributed to solidification of an outer porous layer well before the cycle is completed, as will be presently described in greater detail. It is further attributed to centrifuging while under vacuum and cooling by evaporation, whereby the vacuum is released, the product is not collapsed by externally applied pressure. In other words, at the time the vacuum is broken the pores are open and the particles are relatively firm or rigid. Therefore air or other gas can flow into the pores without causing the particles to collapse. Where the final product is subjected to a higher vacuum and the product thereby cooled and oil solidified before the vacuum is released, this likewise contributes to the production of a product that is comparable in volume and form to the source material.

In some instances special preparatory processing of the source material may increase the volume of the final product. Thus immediately before freezing the material can be warmed to a temperature of the order of from 100–140° F., and then trays containing the warm particles placed upon shelves that are chilled by circulating fluid refrigerant therethrough. The atmosphere surrounding the trays is evacuated to a partial vacuum of the order of 29 inches mercury column. The moist particles are thereby expanded immediately before freezing and are then frozen in expanded form. Such frozen and expanded particles can be stored and applied to my method in the same manner as previously described. It has been found that such expansion at the time of freezing materially increases the volume of the final dehydrated product. The interiors of the particles of such final products tend to have larger air pockets or voids, which tend to promote more rapid rehydration upon contact with water. Products such as fresh peas treated in this manner have internal kernels that are pressed against the inner surfaces of the skin, leaving a relatively large air void between the two kernels. Dehydrated blueberries produced in this manner have somewhat similar characteristics. In general both dehydrated green peas and the blueberries treated in this manner have a plump exterior appearance and tend to be more attractive than the products produced without such preliminary vacuum expansion. Certain materials appear to be suited to this treatment, such as those having an outer skin or skin-like surface and a substantial amount of entrapped air. Particular reference can be made to blueberries, peas, apples, pre-dried apple and peach wedges, fresh or partially dehydrated cereal grains (e.g., corn) and meat. Meats can be treated by this procedure to increase the porosity of the final product, this facilitating rehydration.

As previously mentioned preparatory processing of the source material may considerably modify its natural state. For example, cherries can be treated by conventional methods to form what is known in the trade as maraschino cherries. Such cherries in their processing have been subjected to brine hardening and cooking and the addition of sugar syrup. The previously mentioned conventional glace treatment likewise involves cooking with introduction of additional sugar. The moisture content of such processed materials is considerably less than the moisture content of the fresh source material. For example maraschino cherries have a moisture content of the order of about 60% and glace cherries have a moisture content of about 20%. These processed materials can be treated in accordance with my method to produce products having a moisture content of the order of from 2 to 20% (the higher moisture content is permissible with such products because of the sugar content). Such products when rehydrated form products comparable to the original maraschino or glace products.

The preliminary processing of materials such as cereal grain, chick peas and lentils, may involve rehydration of the dried material and removal of skins after which the moist kernels are frozen. Also dried meat can be rehydrated, frozen and then processed according to my method. Before rehydration cereal grains can be subjected to various milling operations, such as for the removal of cortex, bran and germ portions, thus providing a readily rehydratable product. Soluble ingredients can be introduced in the rehydrating liquid, such as flavoring or seasoning, vegetable or animal gums and the like.

Previous reference has been made to pickling as a pretreatment. For example my method can be applied to pickled cucumbers, tomatoes, olives, onions, peppers and the like.

As previously mentioned, with respect to meat, fowl and seafoods, cooking can be applied as pretreatment, with or without seasoning. Also conventional preserving methods can be used such as brine treatment, smoking, corning and the like.

With respect to most fruits and vegetables, generally it is desirable to use fresh source materials, whereby the final product upon rehydration is quite similar to the original fresh source material.

In further explanation of preliminary dehydration, after cutting certain fruits (e.g. peaches) or vegetables into particles or slices of suitable size, they can be subjected to conventional dehydration methods, as by contact with warm air at temperatures of the order of 130–160° F., whereby the contained moisture is reduced to a substantial extent, such as to a moisture content of from 15 to 60%. Commercial types of dehydration or drying kilns can be employed. In place of using such air dryers, sun drying by exposing to the sun in trays can be employed. In some instances such dehydration can be applied before the product is cut into the desired forms. Such materials can be directly frozen and subjected to my method, but preferably they are partially rehydrated before freezing. Partial rehydration produces products that have greater porosity and less weight per unit volume. Fruits which can be treated in this manner include dates, figs, raisins, peaches, pears and apricots.

With respect to products that are partially concentrated or preserved with added sugar, further reference can be made to various candied fruits including pineapple, candied sweet potatoes and yams. Other pre-dried products to which the invention can be applied after rehydration, include chestnuts and dried mushrooms.

With respect to the more common dried fruits such as tree ripened dates, dried figs, prunes and kiln dried apples which may contain about 20% moisture, such products after storage can be cleaned and subjected to rehydration, whereby the moisture content is doubled, and then frozen. Thereafter they are subjected to my method. The products obtained after such rehydration have increased volume compared to dried source material before hydration due to restoration of the previously shrunken tissue structure. Also they are porous, relatively tender, and more readily rehydrate on contact with water. The dehydration cycle can be shortened to remove products with a moisture content comparable to that possessed by conventional dried fruit such as 20%.

Many formulated products can be dehydrated by my method. Examples are products made from dough, with or without a leavening agent such as baking powder or yeast, and with or without partial preliminary baking to activate leavening. Further examples are dumplings, products known as snacks and products containing a filler or like mass of food material, and an enclosing layer of dough, such as perforated raviolis with a meat type filler. Another example is a product having a fruit type filler, such as pieces of fruit, fruit marmalade or paste, partly or entirely enclosed in a dough.

It is common in the dried fruit industry to apply sulfuring to certain dried fruit to extend the shelf life and in general to aid in preservation. In accordance with my method, when sulfuring is desired, the final dehydrated product can be introduced into a sulfuring room where it is exposed to conventional sulfuring gas. The gas should be at a temperature slightly above the melting point of the oil, or the product otherwise warmed to such temperature. After removal from the sulfuring room the product is permitted to cool whereby the surface retains applied sulfur. Another procedure is to dip the cleaned and cut source material in a solution of sodium sulfite, after which the material is frozen. After being dehydrated by my method, the final product will have a residual sulphur content depending on the particular source material treated, and the strength of the treating solution.

My method can be advantageously employed to provide a new technique for the manufacture of glace cherries and like fruit products having an added sugar content. Thus drained brine cherries can be cooked in a sugar syrup that is gradually concentrated to a 25% syrup, with color and flavoring added. After draining off excess syrup, such cherries are frozen and processed according to my method, with removal from the hot oil at about 20% moisture content. By this procedure a high quality product can be made, having the original color, flavor and cell structure retained, and this is obtained by treatment steps that are simple and time saving compared to conventional methods.

With respect to applying the method to cereal grains, field sun dried cereal grain can be prepared by cleaning and rehydrating, after which it is frozen, and the frozen product thereafter subjected to my method. Before rehydration the grain can be subjected to milling operations, such as may serve to remove cortex and bran portions, and if desired, removal of germs. The resulting product is a dehydrated granule having a moisture content of the order of from 2 to 3% and which has the volume and form comparable to that of the original grain granules. It is relatively tender and crunchy, and rapidly rehydrates on contact with water. After rehydration, the form of the original granules is retained. By-products resulting from milling such as wheat germ, can likewise be dehydrated by my method.

In the foregoing it has been assumed that cooking or browning during the dehydration cycle is to be minimized. However, in some instances particularly with farinaceous materials (e.g. flour dough) it may be desirable to carry out a predetermined amount of baking or browning of the products simultaneously with dehydration. This can be accomplished by the use of higher oil temperatures after the first initial evaporating phase, such as temperatures of the order of 220 to 300° F.

In some instances (e.g. corn) the product obtained is suitable for eating without further treatment by the consumer. Also products like garbanza beans, lentils, chestnuts or cereal grains, when dehydrated in accordance with my method, can be subjected to browning and seasoning to produce a highly edible nut-like product.

In most instances my dehydrated product will be further processed by the consumer before it is eaten. For example, dehydrated vegetables like green peas can be immersed in warm water for rehydration, after which they are subjected to conventional cooking. As a simpler procedure the housewife may introduce a measured quantity of the dehydrated material into a cooking vessel, after which a predetermined amount of water is added, the vessel covered and placed in a warm oven. As the water is heated to the boiling point, it rehydrates the vegetable, and carries out the desired cooking. By this procedure the preparation of vegetables ready for eating may require not more than about 5 to 10 minutes. Instead of requiring the housewife to place a measured amount of the dehydrated material in a cooking vessel, the dehydrated material may be sold in a metal foil cooking vessel, whereby the housewife need only add a measured amount of water to this package and then place it in a hot oven for a predetermined period of time.

In some instances, the dehydrated product instead of being sold as such can be introduced into so-called baking pre-mixes. For example, dehydrated blueberries made in accordance with my method can be introduced into a dry pancake pre-mix, whereby when a pancake batter is formed with water or milk the blueberries tend to hydrate, with hydration being completed while the pancakes are being cooked. With respect to such pre-mixes, a desirable feature of my vegetable and fruit products is that they suspend themselves in the pre-mix, and in the baked dough, and thus float in light batters of the pancake type.

The product resulting from the foregoing method has novel properties which distinguish it from dehydrated products produced by prior methods. Considering particularly products made by application of centrifuging under continued partial vacuum at the end of the dehydration cycle, all of my products are of excellent quality, having reference to such characteristics as color, flavor, nutritive value, form and size, fragility, shelf life, rate and extent of rehydration.

Color retention is good to excellent, including retention of the fresh green and red color of fruits and vegetables, as has been demonstrated by actual color analyses.

Mushrooms are an exception in that they take on the light brown color of cooked mushrooms, presumably due to chemical changes in color constituents, probably caused by enzymatic activity, and not to surface browning or pick-up of color from the treatment oil. There is a slight deepening of color in all products but not to an extent sufficient to materially modify the original color tone. Some materials which have a natural white color, like sliced potatoes, are slightly darkened to the extent of taking on an off-white or light cream color. Such coloring can be minimized by special pretreatments, such as dipping the material before freezing into sulfite solutions or bleaching agents.

Flavor is excellent for all of the products. No burned or off-flavors are developed. The residual oil content derived from the method has no material masking or modifying effect on the flavor of the rehydrated product, unless desired flavoring constituents are deliberately added in the manners previously described. Blending in or substituting another oil for that used in the initial phase can serve to minimize or eliminate undesired pick-up of flavor or darkened particles from the initial oil.

The nutritive value of the products is substantially unimpaired, having particular reference to carbohydrates, proteins and vitamins. Starch granules such as are present in certain vegetables (e.g., potatoes, rutabagas, parsnips, turnips and sweet potatoes) are completely gelatinized. This enhances suitability for consumer use, and does not detract from nutritive value. The proteins present may be somewhat denatured, but without inhibiting rehydration or materially affecting flavor or nutritive value. High protein materials like meat, fowl, and seafood generally are cooked in pretreatment, and thereafter no further denaturing occurs in processing.

In form, the dried particles of the final products are similar to the particles of the source materials. In other words, the original physical shape is largely retained in the final product. Shrinkage in volume is not excessive and can be minimized by the special procedures described, including vacuumizing during freezing, and/or application of a high vacuum at the end of the cycle.

All of my products are relatively durable in resisting mechanical attrition or abuse. Thus they can be handled or packaged without the development of excess fines. This is in contrast with certain dehydrated products produced by the freeze-dry method, such as cooked meat, fowl and sea food, which are quite fragile. I attribute lack of fragility to the plasticizing effect of oil derived from the method and distributed mainly as minute globules in the intercellular spaces, and to retention of the natural bond between the cells, which appears to be lost or impaired in the freeze-dry method.

As indicated by accelerated oxidation tests, shelf life is as good or in some instances better than products made by the freeze-dry method, having reference to the ability of material to resist deterioration by oxidation when exposed to the atmosphere. The oil content derived from the method tends to protect low fat materials from oxidation, and to inhibit absorption of atmospheric moisture.

My products are excellent with respect to rate and extent of rehydration. This is an important characteristic because it is intended that the products be rehydrated before being consumed. Tests have shown that products made by my method, when immersed in water at 60° C., rapidly absorb water to form materials which in form, size, appearance and texture, are substantially the same as the source materials. The residual oil content does not interfere with such absorption, which I attribute to the fact that residual oil derived from the method is dispersed mainly in the form of minute discrete masses, as distinguished from plates, films or other masses of substantial size which tend to block moisture penetration and absorption. The minute discrete masses are distributed at random, being mainly in the intercellular spaces and in the outer rather than the inner regions. Good rehydration properties are also attributed to the fact that the product is porous whereby it is readily penetrated by water. The tissue or cell structure is readily wettable and water absorptive, and has the ability to revert to a form and character comparable to that of the original source material.

The amount of oil derived from the method and retained in the product varies with the manner in which the process is carried out, the character of oil employed, and with the particular material being treated. Some retain more oil than others under the same treatment conditions. I attribute this to differences in chemical and physical properties, including differences in the make-up of the tissue or cell structure. Materials which normally have a substantial amount of oil or fat, such as cooked meat, lose only a small amount of their natural fat, and retain some of the oil used in dehydration.

Actual tests have shown that a wide variety of fresh vegetables when dehydrated by my method have a retained oil content per unit volume ranging from about 100 to 200 mg./cc. Fruits produce products having somewhat more fat per unit volume, such as from 100 to 235 mg./cc. Cooked meat and fowl produce products within the range of about 100 to 150 mg./cc. Seafood like shrimp and fish produce products within the range of about 150 to 255 mg./cc. Condiments like mushrooms produce products of the order of 140 to 160 mg./cc.

Evaporation throughout the cycle, including the rapid evaporation during the first few minutes of the cycle, takes place in such a manner as to leave a porous product capable of ready and substantially complete rehydration to form a particle having characteristics including form and size, similar to the source material. The outer regions of each particle are dried in porous form and to an extent tending to lend rigidity and firmness, before the inner portions attain a comparable moisture content and rigidity. Thus a porous outer region or layer is formed well before the end of the cycle, which conforms to the shape and size of the original particle, and which has sufficient rigidity and strength to resist serious inward overall shrinkage, such as might otherwise take place with substantially complete collapsing of the inner tissue. Even though the inner tissue may be spongy in character, as with many succulent vegetables, the outer layer of the stronger or more rigid cellular tissue predominates in maintaining form, size and porosity. The inner tissue, particularly if soft and spongy, may be somewhat disrupted during the dehydrating cycle, but it retains essentially the same spacial positioning within the outer more rigid regions. As revealed by microscopic examination, the inner tissue may bunch together in the form of veins or strands that are separated by voids, without causing inward collapsing of the outer porous structure.

Examples of my invention are as follows:

*Example 1.*—The source material was fresh ripe blueberries. They were prepared by washing, after which they were individually frozen and stored at a temperature of about 5° F. The equipment was similar to that shown in FIGURE 3. The tank 40 was provided with a quantity of hydrogenated cotton seed oil having a melting point of about 108° F., and heated to a temperature of 260° F. A measured quantity of the frozen berries in the proportion of 5 pounds of berries for each 100 pounds of oil, was introduced into the raised basket of the tank, and while being held above the oil, a vacuum corresponding to 28 inches mercury column was applied. After a period of about 1 minute, during which the berries were deaerated, the basket was lowered to the bottom of the tank. Immediately a foam-like medium was formed consisting of water vapor and oil, and which occupied several times the volume of the original oil body. The initial phase of the cycle extended over a period of about 4 minutes following introduction of the blueberries, and during that time the oil cooled to a temperature of about 160° F. Also there was vigorous agitation with rapid evolution of water vapor. The partial vacuum dropped from an initial value of 28 inches mercury column to about 25 inches, and then increased toward the end of the first 5 minutes to about 28 inches. Some heat was applied to the tank by means of an enclosing steam jacket, whereby from a low temperature of about 160° F., at the end of the first 4 minute period, the temperature of the oil rose to about 205° F., and thereafter was maintained at about 195° F. About 10 minutes after commencing the cycle, the screen 42 was lowered to maintain the particles immersed in the oil for the remainder of the cycle. After a total dehydrating period of about 18 minutes, the basket 42 was elevated to the upper part of the tank, where free oil was permitted to drain from the product, while application of the vacuum was continued. Thereafter the vacuum was broken and the product removed from the tank.

The product resulting from the foregoing example had a residual oil content of about 60%, and a moisture content of about 2% (total). Although the product did not have certain desirable properties of products obtained by centrifuging under vacuum at the end of the dehydrating cycle, it was superior in many respects to dehydrated blueberries produced by conventional dehydration methods. Particularly the product had about the same shape and size as the original fresh berries, and the color and flavor were excellent.

*Example 2.*—The same procedure was followed as in Example 1, except that normally liquid sesame oil was used. After removal of the product from the tank, it was permitted to set for about 5 minutes for cooling, and then the berries were introduced into a centrifuge of the basket type, where the product was centrifuged for the removal of further residual oil. A current of warm air at a temperature of about 140° F. was introduced into the centrifuge basket to aid in oil removal. The final product was similar to the product obtained from Example 1, and had a residual oil content of about 50%.

In general this product was about the same as that of Example 1, except for the reduced oil content.

*Example 3.*—The same source material and procedure was followed as in Example 2. However, in conjunction with freezing, the berries were first warmed to about 120° F. and then subjected to a partial vacuum of 28 inches mercury column immediately before and during freezing.

The final product was noticeably puffed or expanded.

*Example 4.*—Blueberries were prepared and frozen the same as in Example 1, and stored at −20° F. Laboratory equipment was used similar to that shown in FIGURE 3, the basket 42 being 11 inches in diameter. The oil was hydrogenated vegetable oil shortening having a melting point of about 108° F., and at an initial temperature of 360° F. About 1 pound of frozen berries was introduced for each 10 pounds of oil. The procedure employed to the end of the dehydrating cycle was substantially the same as in Example 1. The dehydrating period was 20 minutes and the applied vacuum was 28 to 29 inches mercury column. After raising the basket 42 and permitting oil to drain, the basket was rotated at 1150 r.p.m. for about 4 to 5 minutes while application of the partial vacuum was continued, to effect further removal of free oil. Then the vacuum was broken and the product removed.

The product obtained was different from the products obtained in Examples 1 and 2, particularly because of its reduced oil content. The moisture content was 1.73% (total), and the residual oil content about 39.07%. The density was 0.5 mg./cc. and the residual oil content in terms of weight per unit volume was about 200 mg./cc. The product quickly rehydrated when immersed in water at 60°. Thus in 1 minute increase in weight by water absorption was 19%, in 10 minutes 36%, in 30 minutes 73%, and in 60 minutes 95%.

*Example 5.*—The source material was Minnesota Red potatoes. They were peeled, sliced and diced to pieces measuring ¾ by ¾ by ⅛ inch. They were frozen and stored at −20° F. The laboratory equipment used was similar to that shown in FIG. 3, the basket 42 being 11 inches in diameter. The oil was hydrogenated vegetable oil shortening, as in Example 4, at an initial temperature of 360° F. About 1 pound of frozen potatoes were introduced for each 10 pounds of oil. The dehydrating period was 15 minutes and the applied vacuum was 28–29 inches mercury colum. After raising the basket 42 and permitting oil to drain, the basket was rotated at 1150 r.p.m. for about 4 to 5 minutes, while application of the partial vacuum was continued. Then the vacuum was broken and the product removed.

The product obtained from the foregoing example was of good quality with a moisture content of 2.34% (total). The residual fat content was 20.55%, the density 0.50 gm./cc. and the fat content per unit volume was 103 mg./cc. The product readily rehydrated upon contact with water. Thus when contacted with water at 60° C., the increase in weight by water absorption was 89% in 1 minute, 142% in 10 minutes, and 229% in 30 minutes.

*Example 6.*—The source material was fresh White Rose potatoes. They were peeled and shredded into strips or shreds about ⅛ inch thick. The shreds were dipped for a period of 1 minute in a sodium bisulfite solution containing 1 ounce of sodium bisulfite for each 5 pounds of water. Then the potato shreds were individually frozen and stored at +7° F. The equipment used was similar to that shown in FIGURE 4. The tank 61 was charged with 3000 pounds of hydrogenated vegetable oil shortening having a melting point of about 108° F., and an initial temperature of 320° F. Two hundred (200) pounds of the frozen shredded potatoes were supplied to the container 66, and this charge subjected to a partial vacuum (28 inches), together with the interior of the tank. About 7 seconds were required to feed the charge into the tank 61. When the first part of the charge contacted the oil, immediately a mixed water vapor-oil medium or foam was formed which extended upwardly into the tank 61, and through which the remaining part of the charge was introduced. Most of the foam subsided after the first 3 minutes of the cycle, and shortly thereafter the screen 61 was lowered to maintained the product immersed in the oil. The total time of the cycle was 15 minutes, plus an additional 3 minutes required for pumping out oil at the end of the cycle. The partial vacuum applied started at 26 inches mercury colum, and during the initial phase dropped to about 25 inches, and thereafter rose again to about 28 inches at the end of the first 5 minute period. The temperature of the oil dropped to about 160° F. in the first 3 minutes, and then heat was applied to elevate the oil temperature to about 200° F., where it remained for the rest of the cycle. The product was deposited in the centrifuge basket 75 (36 inches in diameter) by the time free oil had been pumped from the tank and housing 73, and then the centrifuge basket was rotated at 300 r.p.m. while the vacuum was maintained at about 28 inches mercury column. Thereafter rotation of the basket was discontinued and the housing 73 disconnected from the tank and the product removed.

The product obtained from the foregoing example was of excellent quality, with a moisture content of about 1.2% (total). Color and flavor were excellent and the product readily rehydrated while contacted with water.

*Example 7.*—The source material was the same as in Example 5. Potatoes were cut into slices each about ⅛ inch thick, and then dipped into the same sodium bisulfite solution. Then the slices were individually frozen and stored at about +9° F. The same equipment and general procedure were used as in Example 5. However, the charge ratio was 260 pounds of the frozen potatoes to 3000 pounds oil heated to 330° F. During the first 2½ minutes of the cycle, the oil temperature dropped to 160° F. Heat was applied to return the temperature to about 200° F. The temperature was maintained substantially at that level, being at 205° F. at the end of the cycle. The total time period of the dehydrating cycle was 20 minutes, plus an additional 2½ minutes for pumping out the oil. The initial applied partial vacuum was 26 inches mercury column, which dropped to 25 inches in the first minute, and then returned to 27.5 inches where it remained for the rest of the cycle. The screen 64 was lowered below the oil line about 12 minutes after commencing the cycle. After pumping out the oil the product was centrifuged for about 3 minutes, after which the vacuum was released.

The product obtained by the foregoing example was substantially the same as the product obtained from Example 4, except that the material was in the form of slices. The moisture content was about 1.4% (total).

*Example 8.*—The source material was fresh carrots. After washing, the carrots were sliced laterally into slices measuring about ⅛ inch thick. Thereafter they were frozen and stored at −20° F. Laboratory equipment was employed similar to that shown in FIGURE 3. Charging ratio employed was 1 pound of frozen material for each 10 pounds of hydrogenated vegetable oil shortening with the oil at an initial temperature of 360° F. The general procedure used in employing the apparatus was the same as in Example 3. After introducing the frozen charge, the oil temperature dropped rapidly, attaining a minimum temperature of about 205° F. The partial vacuum was maintained at about 28 to 29 inches mercury column. The total time of the dehydrating cycle was 30 minutes after which the product was removed from the oil. After a short period of draining, the product was centrifuged under vacuum as in Example 4, and thereafter the vacuum released.

The product obtained by the foregoing example was of excellent quality as compared to dehydrated carrot produced by the more conventional processes. It was excellent with respect to retention of color and flavor. It had a fat content of 51.8%, and in terms of fat content per unit volume, it contained 178 mg./cc. Its moisture content was 3.40%, and its density was 0.35 mg./cc. It readily rehydrated on contact with the water at 60° C., to produce a reconstituted product substantially the same as the original carrot. Thus in 1 minute the increase in weight by water absorption was 95%, in 10 minutes 150%, in 30 minutes 189%, and in 60 minutes 252%.

*Example 9.*—The source material was fresh carrots, the same as in Example 7. The equipment used was substantially the same as that shown in FIGURE 4. The frozen slices were stored at +7° F. The charge was 225 pounds of the frozen carrots for 3000 pounds of hydrogenated vegetable oil heated to 325° F. During the first initial phase of the cycle the temperature of the oil dropped to 160° F. Heat was applied to return the temperature to about 200° F., where it remained for the rest of the cycle. The total dehydrating cycle required about 14 minutes, plus about 3 minutes to pump out the oil. The screen 64 was lowered to retain the product depressed below the surface of the oil during the last 5 minutes of the 14 minute cycle. Partial vacuum commenced at about 27.5 inches mercury column, immediately dropped to about 25 inches mercury column, and thereafter returned to about 27.5 inches mercury column after the first 5 minutes, and remained substantially at the value for the rest of the cycle. After pumping out the free oil, centrifuging was carried out under vacuum for about 3 minutes (36″ basket rotated at 300 r.p.m.) after which the vacuum was broken.

The product obtained by the foregoing example was substantially the same as the product obtained in Example 6. The moisture content was about 2.10% (total). Because of the shorter cycle, the fat content was deemed to be less than in Example 6, the density less, and also the ratio of fat to unit volume somewhat reduced.

*Example 10.*—The source material was fresh celery stalks. After washing, the stalks were cut into ¾ to ⅞ inch lengths. They were then frozen and stored at −20° F. The laboratory equipment employed was similar to that shown in FIGURE 3, and was operated the same as described in Example 3. The initial oil temperature was 360° F. and the charge ratio was that one pound of frozen material was employed for each ten pounds of oil. The applied partial vacuum was maintained at about 28 to 29 inches mercury column, throughout the cycle. The total time of the dehydrating cycle was 15 minutes. During the initial phase of the cycle the temperature dropped to 200° F., where it was maintained for the rest of the cycle. The product was centrifuged under vacuum as in Example 4 before the vacuum was released.

The product resulting from the foregoing example was of excellent quality. The moisture content was 2.2% (total), the fat content 21.92%, density 0.36 gm./cc. and the fat content per unit volume 187 mg./cc. The product readily and completely rehydrated upon contact with water at 60° C. Thus in 1 minute increase in weight by water absorption was 154%, in 10 minutes 245%, in 30 minutes 290% and in 60 minutes 350%. After rehydration the product has substantially the same form, size and general appearance as the fresh material.

*Example 11.*—The source material was fresh celery stalks, substantially the same as in Example 9. After washing it was blanched in a pressure retort, by contact with steam under pressure of about 10 p.s.i. and at a temperature of about 240° F., for a period of 3 minutes. Thereafter is was cooled to room temperature and frozen and stored at +9° F. The apparatus employed was similar to that shown in FIGURE 4. The charge ratio was 295 pounds of frozen material to 3000 pounds hydrogenated vegetable oil at a temperature of 330° F. At the time the product was first introduced into the oil, the partial vacuum was 26.5 inches mercury column. In about 3½ minutes the oil temperature dropped to 140° F. During the same time the vacuum dropped to about 25½ inches mercury column in about 1 minute, and then increased to about 28 inches mercury column at the end of the first 3 minute period, where it remained for the remainder of the cycle. The temperature of the oil was maintained at about 195° F., after the initial phase of the cycle. The total dehydrating time was 19 minutes, plus about 3 minutes to pump out the free oil. After pumping out the oil the material was centrifuged (36 inch basket at 300 r.p.m.) under vacuum for about 3 minutes, after which the vacuum was broken. Thereafter the product was air cooled and packaged.

The product obtained from the foregoing Example 10 was about the same in quality and characteristics as the product obtained from Example 9. It was more tender after rehydration, because of blanching.

*Example 12.*—The source material was green string beans. They were prepared by washing and cutting into shreds about ⅛ inch thick, of a length corresponding to that of the bean (2½ to 3 inches). They were then frozen and stored at about 0° F. The equipment used was similar to that shown in FIGURE 4. The charge ratio was about 339 pounds of the frozen material to 3100 pounds of hydrogenated vegetable oil at an initial temperature of 340° F. When introduction of the frozen material was commenced, the applied partial vacuum was 26½ inches mercury column. In a period of 4 minutes the oil temperature dropped to 170° F. Heat was applied to return the oil temperature to 190° F., and thereafter this temperature was maintained for the rest of the cycle. The total period of dehydration was 12 minutes, plus 3 minutes for pumping out the free oil. The screen 64 was lowered in position about 5 minutes before the end of the cycle. The applied partial vacuum was first about 26½ inches, which immediately fell to about 24 inches for about 2 minutes, and then returned to 28 inches, where it remained for the rest of the cycle. Centrifuging (36 inch basket at 300 r.p.m.), was applied after pumping out the oil, the same as in Example 9.

The product obtained in the foregoing example was of excellent quality, with good color and flavor retention. The moisture content was 1.6%. It readily rehydrated upon contact with warm water.

*Example 13.*—The source material was fresh mushrooms of a type commonly marketed in the United States. After washing the buttons and stems were separated and the larger pieces split. They were then frozen and stored at −20° F. The equipment employed was the laboratory equipment referred to in Example 3, and similar to the equipment of FIGURE 3. The charge ratio was 1 pound of frozen material for each 10 pounds of hydrogenated vegetable oil shortening, at a temperature of 360° F. The applied partial vacuum was maintained at about 28 to 29 inches mercury column. The initial oil temperature fell rapidly to about 200° F., where it was maintained for the remainder of the cycle. The total dehydrating cycle was 20 minutes. Thereafter the material was raised from the oil, and centrifuged as in Example 4 to remove remaining free oil. Then the partial vacuum was released and the product removed.

The product obtained by the foregoing example was excellent in quality. It had a moisture content of 0.6%, a density of 0.34 gm./cc. and a fat to unit volume ratio of 148 mg./cc. It readily rehydrated upon contact with water at 60° C. Thus in 1 minute the weight increase by water absorption was 80%, in 10 minutes 130%, and in 30 minutes 190%. It had a brown color, as distinguished from the relatively white color of the source material, due to chemical changes previously mentioned. In general the quality was excellent.

*Example 14.*—The source material was commercially canned water chestnuts in the form of slices each measuring about ⅛ inch thick. After draining, this material was frozen and stored at 11° F. The equipment employed was substantially as shown in FIGURE 4, and 223 pounds of the frozen material were introduced into 3100 pounds of hydrogenated vegetable oil at 330° F. The oil temperature immediately dropped from 330° F. to about 180° F., and by supplying heat the temperature was raised and retained at about 200 to 203° F. for the remainder of the cycle. The total time period of the dehydrating cycle was 15 minutes, plus 3 minutes for pumping out the oil. The initial partial vacuum was about 26.5 inches, which immediately dropped to about 23.75 inches and then returned to about 27.5 inches in the first 2 minutes, where it remained for the rest of the cycle. Some oil was continuously recirculated by removal from the bottom and reintroduction at a level just under the float level of the product. Screen 64 was lowered for the last 4 minutes. After removing the free oil the product was centrifuged (36 inch basket at 300 r.p.m.) under vacuum for 4 minutes, before the vacuum was released.

The product obtained was of good quality, and was suitable for many purposes where water chestnuts are employed. Moisture content was about 1.6% (total).

*Example 15.*—The source material was fresh lean beef. It was cut into 1 inch cubes and cooked for 20 minutes at 15 p.s.i.g. steam pressure. The cooked material was diced to form cubes each measuring about ½ inch thick or less. After draining off juices extracted during cooking, the cooked beef was frozen and stored at about −20° F. The apparatus employed was similar to that referred to in Example 3. The charge ratio was 1 pound of frozen beef for each 10 pounds of hydrogenated vegetable oil shortening at an initial temperature of 360° F. Applied partial vacuum was maintained at about 28 to 29 inches mercury column. Immediately upon introducing the charge of frozen beef, the temperature of the oil dropping rapidly to about 200° F., where it remained for the rest of the cycle. The total time period for dehydration was 14 minutes. Thereafter the product was removed from the oil, and after draining, the product was centrifuged (as in Example 4) under the same vacuum for the removal of remaining free oil. Thereafter the vacuum was released.

The product obtained from the foregoing example was of excellent quality. It had an overall fat content of about 14.5%, about 90% of which originated with the treatment oil. The moisture content was 0.66% (total). The density was 0.84 gm./cc., and the fat content per unit volume was 122 mg./cc. Color and flavor retention were excellent. The material readily and completely rehydrated upon contact with water at 60° C. Thus in 1 minute the increase in weight was 43%, in 10 minutes 72%, in 30 minutes 79% and in 60 minutes 82%.

*Example 16.*—The source material was cooked chicken. It was prepared by boiling, boning, removal of the skin, and dicing to pieces about ½ inch thick. This material was individually frozen and stored at about −20° F. It was dehydrated by use of essentially the same procedure and equipment as referred to in Example 14. The total time of dehydration was 12 minutes.

The product obtained in Example 14 was of excellent quality. The moisture content was 1.57% (total) and the fat content 16.96% (total). The density was 0.86 gm./cc. uncorrected, and 0.70 gm./cc. corrected. The oil content per unit volume was 146 mg./cc. The product readily and completely rehydrated upon contact with water at 60° C. Thus in 1 minute its weight increase was 74%, in 10 minutes 89%, in 30 minutes 91%, and in 60 minutes 96%. In contrast with the highly fragile character of cooked chicken dehydrated by the freeze-dry process, my product was not highly fragile, and could be handled without excessive formation of fines.

*Example 17.*—The source material was boiled shrimp which had previously been peeled and deveined and frozen to −20° F. Before being treated by my method they were split whereby each half was not over about ⅜ inch in thickness. The same laboratory apparatus and procedure were employed as in Example 14. The charging ratio was 1 pound of fozen shrimp for each 10 pounds of hydrogenated vegetable oil shortening. The temperatures were the same as in Example 13, and the total time period for dehydration was 30 minutes. Centrifuging under vacuum was applied.

The product obtained from this Example 16 was of excellent quality, with good color and flavor retention. The moisture content was 1.04% (total), and the fat content 38.36% (total). The density was 0.43 gm./cc. and the oil content per unit volume was 165 mg./cc. In contrast with shrimp dehydrated by the freeze-dry process, the product was not highly fragile and withstood handling without excessive formation of fines. It readily and completely rehydrated upon contact with water at 60° C. Thus in 1 minute its weight increase was 103%, in 10 minutes 150%, and in 30 minutes 150%.

*Example 18.*—The source material was fresh salmon. After steam-cooking and draining, it was cut into cubes of about ½ inch thickness, and frozen to −20° F. Thereafter it was dehydrated by use of the same equipment and substantially the same procedure described in connection with Example 13. The charge ratio was 1 pound of product to 10 pounds of hydrogenated vegetable oil shortening at an initial temperature of 360° F. The oil temperature dropped to about 237° F., where it was maintained for the rest of the cycle. The total time period for dehydration was 30 minutes. Immediately following the dehydration cycle, the material was centrifuged under vacuum as in Example 4.

The product obtained from the foregoing Example 16 was of excellent quality, with good color retention and flavor. The moisture content was 0.56% (total) and the fat content 39.33%. The density of the product was 0.64 gm./cc. uncorrected, and 0.35 gm./cc. corrected.

The oil content per unit volume was 252 mg./cc. The product readily rehydrated upon contact with water at 60° C. Thus in 1 minute its weight increase was 79%, in 10 minutes 89%, in 30 minutes 82% and in 60 minutes 90%. Although the fat content was relatively high, this is not objectionable with a dehydrated meat or fish product, particularly because salmon normally contains a substantial percentage of natural fat.

*Example 19.*—The source material was commercial maraschino cherries. 150 pounds of the cherries after draining were chilled to 5° F. At that temperature they were firm but did not appear to be frozen. The equipment employed was substantially as shown in FIGURE 4, and was operated as described in Example 4. The 150 pounds of chilled cherries were introduced into 3000 pounds of hydrogenated vegetable oil at 290° F. The applied vacuum was about 26.5 inches mercury column. The temperature of the oil immediately dropped to about 190° F., and this temperature was held for the remainder of the cycle. During the first 4 minutes of the cycle, the partial vacuum fell to about 25.5 inches, and then returned to 27.5 inches, where it remained for the rest of the cycle. The total time period for the dehydration cycle was 15 minutes, plus 3 minutes for pumping out the oil. Screen 64 was lowered for the last 4 minutes of the cycle. After removing the free oil by pumping, the centrifuge was operated under vacuum to remove further oil. Thereafter the vacuum was released and the product removed.

The product made in the foregoing example was of excellent quality, with good color and flavor retention. Its moisture content was about 5%. It readily and completely rehydrated upon contact with warm water.

*Example 20.*—The source material was commercial canned pineapple chunks. Each chunk had a thickness not greater than about ½ inch. 125 pounds of such pineapple chunks, after being drained, were frozen to 0° F. The equipment used was similar to that shown in FIGURE 4, and it was operated as described in Example 4. The 125 pounds of frozen pineapple were introduced into 3000 pounds of hydrogenated vegetable oil heated to 295° F. The oil temperature fell to 160, then returned to and was maintained at 185° F. The initial applied partial vacuum was about 27.5 inches mercury column, which fell to 25 inches and then returned to 28 inches over the first 4 minutes of the dehydrating cycle. The total time period for dehydration was 40 minutes plus 3 minutes for discharging the oil. The screen 54 was lowered below the oil surface about 30 minutes after the cycle commenced.

*Example 21.*—The source material was dates which had been sun-dried and which had a moisture content of about 20%. The dates were cleaned, pitted and subdivided into quarters. These quarters were soaked in cold water for 2 hours whereby the moisture content was increased to about 35%. After draining off free water the rehydrated particles were frozen by the individual quick-freeze method and stored at 0° F. Thereafter they were processed by my method, utilizing equipment similar to that shown in FIGURE 4. The initial oil temperature was 320° F. and the initial partial vacuum about 27 to 28 inches mercury column. The oil temperature quickly dropped to about 180° F. and thereafter by heating the temperature was raised to about 195° F., which was maintained for the rest of the cycle. The ratio was 2 pounds of the frozen material for each 10 pounds of oil. The total dehydrating cycle was about 10 to 12 minutes. At the end of the dehydrating cycle the free oil was pumped out of the tank, the product permitted to drain, and thereafter the vacuum broken. The product was then air cooled to 120° F. and centrifuged in a basket 18 inches in diameter at 600 r.p.m. for about 2 minutes.

The product obtained in the foregoing example was of excellent quality with a porous structure as distinguished from the compact structure of ordinary dried dates. It readily rehydrated when contacted with warm water. The volume was somewhat greater than the volume of the source material.

*Example 22.*—The source material was dried wheat. It was subjected to milling for removal of the cortex and bran portions. It was rehydrated by soaking in an aqueous liquid consisting of water containing meat extract. About 3 pounds of the liquid were employed for soaking each 1 pound of wheat. The liquid was prepared by dissolving 1 ounce of dried meat extract, ½ ounce of powdered gelatin, and ½ ounce salt, in 3 pounds of water. During hydration the liquid was heated to about 200° F. and contact with the liquid at that temperature was continued for about 1 hour. Thereafter free liquid was drained from the rehydrated material, and the material frozen by the individual quick-freeze method to form a free-flowing material which was stored at 0° F. This material was then processed in accordance with my method, using apparatus similar to that shown in FIG. 4. The charging ratio was 1 pound of material for each 6 pounds of oil. The oil was hydrogenated cotton seed having an initial temperature of 360° F. The initial applied vacuum was 27.5 inches mercury column. The total time of the dehydrating cycle was about 10 minutes. The oil temperature dropped rapidly to 180° F. and thereafter was maintained at about 195° F., for the rest of the cycle. There was an initial drop in the partial vacuum applied in the first few minutes, and thereafter partial vacuum was maintained at about 28 inches mercury column. At the end of the dehydrating cycle oil was drained from the material, and the material centrifuged in a basket 7 inches in diameter, and rotated at 1100 r.p.m. Thereafter the vaccum was released.

The product obtained by the foregoing example was porous and free-flowing. It quickly rehydrated without physical disintegration. When placed in a cooking vessel with water, heated to 212° F., and held at that temperature for 5 minutes, hydration was completed with cooking, and with a retention of the natural grain form.

*Example 23.*—The source material was ravioli having a filler consisting of comminuted cooked meat and cooked vegetable materials, and a casing of uncooked dough. The dough casing was perforated on both the top and bottom, after which the raviolis were individually frozen to 10° F. The frozen product was then subjected to my method, using equipment similar to that shown in FIGURE 3. The initial oil temperature was 240° F., and the proportions were 8 pounds of the raviolis for each 100 pounds of hydrogenated vegetable oil. The applied partial vacuum was about 28 inches mercury column. After introduction of the raviolis, the oil temperature dropped to about 160° F., and upon supplying further heat, the temperature was raised to about 210° F., where it remained for the rest of the cycle. The total time period for the dehydrating cycle was 15 minutes. After removal of the raviolis from the oil, they were drained in vacuum, to remove excess oil. Thereafter the vacuum was broken.

The dehydrated raviolis obtained by the foregoing example were a high grade product which readily rehydrated upon immersion in warm water. The moisture content was about 4%. To prepare this product for eating, it is not necessary to soak in water for an extended period of time. The raviolis are merely introduced into a pan with water, and the water brought to a simmer.

*Example 24.*—The following is an example of a formulated dough product. A moist dough was prepared by mixing ingredients as follows:

2 cups wheat flour
4 teaspoons baking powder
1 teaspoon salt
1 tablespoon shortening
⅔ cup whole milk After homogeneous mixing the dough was rolled out into a dough layer, which was punched out to form round discs each about ¼ inch in diameter and ¼ inch thick. The discs were individually frozen and stored at 0° F. They were processed according to my method utilizing equipment as shown in FIGURE 4. The charge ratio was 2 pounds of the dough discs to each 10 pounds of hydrogenated cotton seed oil at 300° F. The initial vacuum was 28 inches mercury column. Shortly after introducing the charge the temperature fell to about 180° F., and then by application of heat was returned to about 195° F., where it remained for the remainder of the cycle. In a total dehydrating cycle of 9 minutes, the moisture content was reduced to less than 5%.

The dehydrated dough product produced in accordance with the foregoing example had a volume about twice the volume of the original discs, due to leavening during treatment. It rapidly rehydrated upon contact with warm water. It was suitable for making dumplings and for use in stews and like food mixes. Centrifuging under vacuum was applied to reduce the oil content.

*Example 25.*—The source material and procedure were the same as in Example 24. However, the discs were subjected to a short baking period before freezing, to activate the leavening and to set the crumb structure of the dough.

*Example 26.*—The source material was fresh sweet corn kernels which had been cut from the cob and frozen by the individual quick-freeze method and stored at +5° F. The equipment employed was similar to that shown in FIGURE 3. A quantity of the frozen corn was introduced into hydrogenated cotton seed oil at a temperature of 360° F., while a vacuum of 26 inches mercury column was being applied. The charge ratio was 1 pound of frozen corn for each 10 pounds of oil. Over a period of about 2 minutes the partial vacuum applied was permitted to increase to about 28 inches mercury column. After a period of 4 minutes following introduction of the corn, oil was removed from the tank and the corn permitted to drain, while application of vacuum was continued. This required about 15 seconds. A fresh quantity of oil at 220° F. was now introduced into the tank. About 8 pounds of oil was introduced in this way for each pound of the original source material. The second oil was hydrogenated cotton seed oil which had been clarified and which contained about 20% dairy butter. Following introduction of the second oil, the cycle was continued under a partial vacuum of 28 inches, for a period of about 10 minutes. At that time the oil was pumped out of the tank, leaving the dehydrated product in the centrifuge basket, and then the centrifuge was rotated for about 3 minutes, with the vacuum being maintained at about 28 inches. Thereafter the vacuum was broken and the product removed.

The product obtained in the foregoing example was of excellent quality, with a porous structure. It readily rehydrated upon contact with warm water. It had a good flavor and could be eaten without further processing.

*Example 27.*—The same source material was used and the same procedure followed as in Example 26. However, at the end of the centrifuging operation the applied partial vacuum was increased to slightly above 29 inches mercury column and held at that time value for about 3 minutes, after which the vacuum was removed by admitting dehumidified air. The resulting kernels were observed to be noticeably puffed. Likewise, it was noted that the kernels immediately upon removal were at a temperature of the order of 120° F., in contrast to a product temperature of about 130–140° F. for the product produced in Example 26 at the time of its removal. This example demonstrated the puffing and cooling effect obtained by applying a relatively high vacuum at or near the end of centrifuging. A higher vacuum than that specified would have reduced the outgoing temperature of the product below 120° F., but was not attainable with the evacuating equipment employed.

*Example 28.*—The same source material was used and substantially the same procedure followed as in Example 26. However, after pumping all of the oil from the tank, and after operating the centrifuge for about 1 minute of the 3 minute centrifuging period, water was introduced into the tank through pipe 47 in an amount equal to 8 ounces for each pound of frozen material. This served to reduce the temperature of the metal centrifuge basket from 170° F. to 105° F. After breaking the vacuum, the outgoing temperature of the product was about 140° F., whereas the same procedure, but without introducing the water, gave an outgoing product temperature of about 155° F.

The photomicrographs shown in FIGURES 6 to 16 illustrate dried products made in accordance with certain of the foregoing examples.

Figure 7:
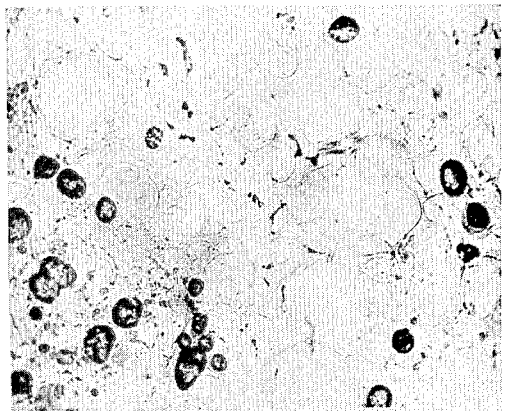

FIGURE 6 is a photomicrograph (327× magnification) of potato as produced by Example 5. The cell structure is shown to be relatively intact except for a noticeable wrinkling. Starch granules do not appear because they are gelatinized. Some of the black splotch areas in the upper right hand corner represent discrete oil masses. More oil masses can be seen in a color photomicrograph of a similar sample, where the product is processed with an oil containing a dye. Most of the oil masses are in the outer regions, and in the intercellular spaces and lining the cell walls. FIGURE 7 shows the same product but with lesser magnification (74× magnification). Minute oil masses appear in the lower left hand area and in the center right hand area. (Not to be confused with the larger bubble-like areas having black edges.)

Figure 8:
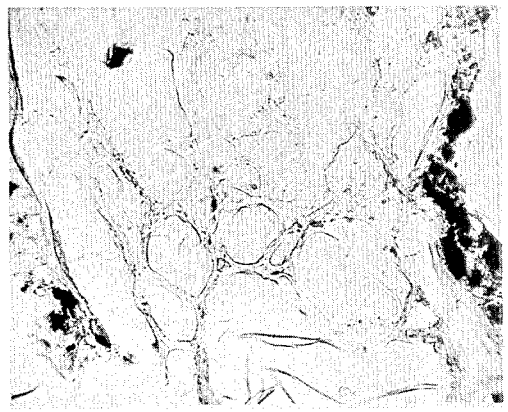

FIGURE 8 is a photomicrograph (74× magnification) of celery as produced by Example 10. The spongy tissue of parenchyma cells are clumped together and appear as vein-like structures with intervening voids. Discrete fat masses are distributed at random, being concentrated mainly in the surface regions. They are seen as dark areas in the right hand portion, in the lower left hand corner, and some in the central portion. More fat masses can be seen in a color photomicrograph. The xylem vessels which form the surface ribs of the celery appear unaltered.

Figure 9:
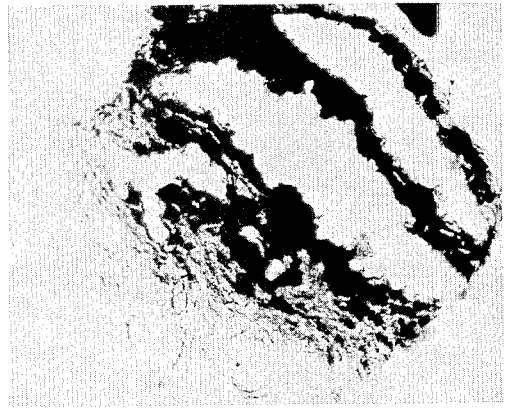

FIGURE 9 is a photomicrograph (74× magnification) of a mushroom stem piece as produced by Example 13. Some of the mycelial strands appear to be compacted into vein-like structures. The remainder of the strands are somewhat compacted with small intervening air pockets. Minute discrete oil masses are located mainly in the surface regions and in the darkened areas of the photomicrograph. Individual oil masses can be seen in a color micrograph.

Figure 10:
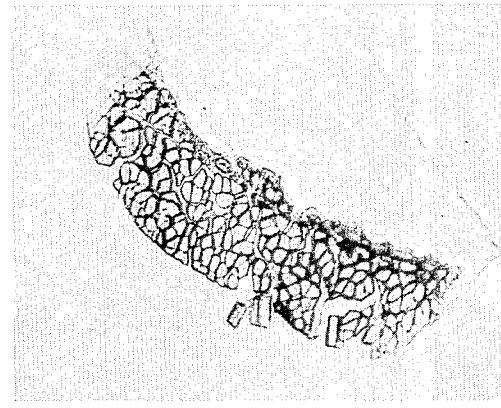

FIGURE 10 is a photomicrograph (74× magnification) showing chicken as produced by Example 16. The cell structure appears in both photomicrograph and is substantially the same as in the source material. Discrete oil masses appear as dark splotches in the lower center and right hand portions. They are more visible in a colormicrograph made from a product processed with oil containing a dye.

Figure 11:
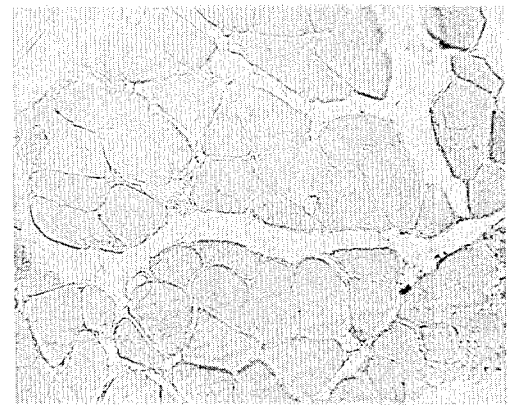

FIGURE 11 is a chicken sample like FIGURE 10 at 327× magnification, after extracting the oil content. The light lines represent cell tissue with an undistorted pattern.

Figure 12:
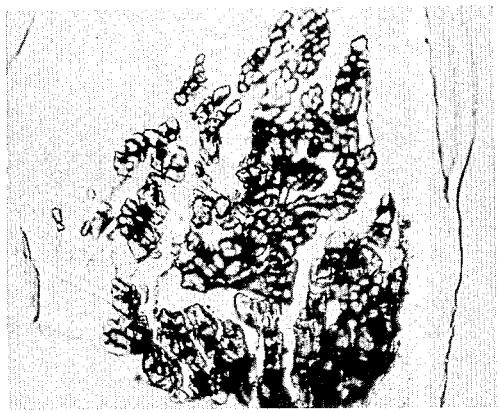

FIGURE 12 is a photomicrograph (32× magnification) showing beef made in accordance with Example 15. The cell structure is substantially the same as in the source material. The discrete oil masses (seen only in a colormicrograph) are randomly distributed.

Figure 13:
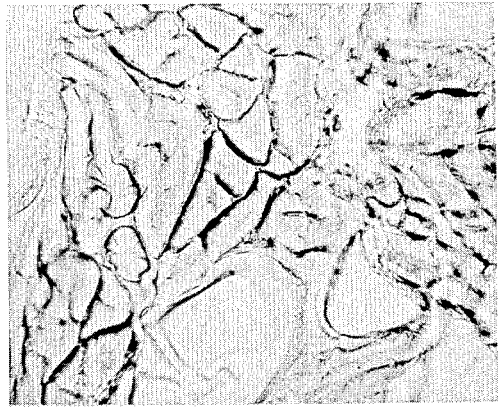

FIGURE 13 is a photomicrograph (327× magnification) of shrimp made in accordance with Example 17. The fat content was extracted from the slide sample. The cell structure is similar to that in the source material.

Discrete fat masses appear in a color photomicrograph, and are randomly distributed in the surface regions, some being in the intercellular spaces.

Figure 14:

FIGURE 14 is a photomicrograph (74× magnification) of blueberries produced in accordance with Example 4. The spongy cell tissue representing the interior of the berry shows some distortion with formation of strands which are either associated with the seeds or are disposed immediately inside the skin. Discrete fat masses which are seen only in a color photomicrograph, are located in the denser cell wall structure around the seed, and also in the inner spongy tissue and immediately inside the skin.

Figure 15:
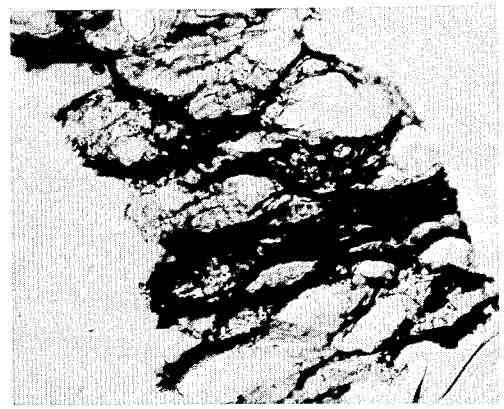

FIGURE 15 is a photomicrograph (74× magnification) showing the carrot product produced by Example 8, and particularly the outer phloem. The fat content was extracted from the slide sample. The cells of both the outer and inner phloem are substantially the same as in the source material. Other cells show some distortion and branching into vein-like structures. Minute discrete fat masses, as seen in a color photomicrograph, are randomly distributed but are found mainly in the inner phloem and outer cortex layer.

Figure 16:
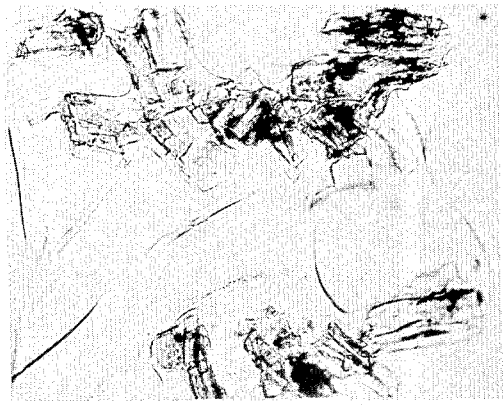

FIGURE 16 is a photomicrograph (74× magnification) showing salmon made in accordance with Example 18. The cell structure is the same as in the source material. Discrete fat masses are located in the intercellular spaces with random distribution. They are in the dark splotch areas located in the upper right hand corner, upper center and lower center portions.

In general the foregoing photomicrograph confirm what previously had been stated with respect to the properties of products made by my method.

In carrying out the method as previously described the dehydrating cycle is completed after the partial vacuum is broken. In the treatment of certain products I have found it advantageous to utilize the above described dehydration method for preliminary rapid removal of the major part of the moisture, and thereafter removing further moisture by some other procedure. Thus the dehydration utilizing hot oil under vacuum can be terminated when the material is of sufficient firmness for handling (e.g. 15 to 50% moisture content depending upon the material), and thereafter subjected to further drying to reduce the moisture content to a lower value (e.g. 1 to 5%). Preferably centrifuging under vacuum is employed before the vacuum is broken, to reduce the residual oil content. Also it is preferably to carry out final drying in such a manner as to minimize injury to heat sensitive and oxidizable components, thereby producing a final product of good quality. It has been found satisfactory to carry out final drying by conventional vacuum dehydration wherein the material is spread on trays and the trays supported on heated shelves in an evacuated chamber. With suitable equipment, vacuum drying in a gaseous atmosphere can be continued at the end of the oil dehydrating cycle, after centrifuging, and without breaking the applied vacuum. While final drying under vacuum is desirable, it will be apparent that other types of drying can be employed, such as contact of the product with warm air or other gas at atmospheric pressure.

When secondary drying in a gaseous atmosphere is utilized following my oil dehydrating cycle, there is a special cooperation in that the product is porous at the end of the oil dehydrating cycle, and therefore its porous structure greatly facilitates subsequent drying in a gaseous atmosphere. The oil content, which is randomly distributed as minute discrete masses, does not interfere with moisture evolution.

It has been found that when the procedure just described is applied to materials like fresh Chinese pea pods, the end product has greater strength in resisting breakage or attrition.

I claim:

1. In a method for the dehydration of particles of predetermined size of moisture containing chilled food material of cellular structure, the steps of subjecting a body of oil at a temperature level within the range of from 240 to 600° F. to a partial vacuum of the order of from 22 to 29 inches mercury column, enveloping a predetermined amount of said particles of said food material in said hot oil while maintaining said partial vacuum and while said particles are chilled sufficiently to effect rapid heat transfer between the oil and the material with rapid evolution of water vapor to create a vapor-oil mixture which envelops said material and causes a rapid drop in temperature of the oil to a level within the range of from 130 to 230° F., removing evolved vapor from the oil with continued application of partial vacuum thereto during said rapid drop in temperature, and then separating the material from the oil and thereafter releasing the partial vacuum.

2. A method as in claim 1 in which removal of moisture from the material is continued after said rapid drop in temperature by retaining the material enveloped in oil at a temperature level within the range of from 130 to 230° F., with continued application of partial vacuum, the material being separated from the oil and the partial vacuum being broken after such continued treatment whereby the material is dehydrated to a moisture content no higher than about 5%.

3. A method as in claim 1 in which particles of material are in frozen condition when enveloped in the oil, and in which the rapid reduction of temperature takes place over a period of the order of from ½ to 4 minutes, the amount of frozen material being from about 4 to 30 pounds for each 100 pounds of oil.

4. A method as in claim 1 in which the material is separated from free oil at the end of the dehydrating cycle and thereafter centrifugal force applied to the material while the applied partial vacuum is maintained.

5. A method as in claim 4 in which after application of said centrifugal force and while the partial vacuum is maintained an impregnant is applied to said food material.

6. A method as in claim 1 in which said food material of cellular structure comprises a farinaceous dough and heating is continued to effect a predetermined amount of baking of said material.

7. A method as in claim 1 in which the partial vacuum is released by applying a substantially anhydrous gas.

8. In a method for the dehydration of frozen particles of predetermined size and moist food materials of cellular structure, the steps of subjecting a body of oil at a temperature level of 240 to 600° F. to a partial vacuum, enveloping a predetermined amount of said frozen particles of said food material in said hot oil while maintaining said partial vacuum to effect rapid heat transfer between the oil and the material with rapid evolution of water vapor to create a foam-like fluid mixture of vapor and hot oil and rapidly reduce the temperature of said oil, said mixture having a volume many times greater than the volume of the original subsided oil body and serving to envelop and disperse said material, thereafter continuing removal of moisture from the material by contacting the same with hot oil under partial vacuum at a temperature level below the initial temperature level but above the vaporization point of the moisture in the material at the applied partial vacuum, whereby further moisture is removed from the material, and then separating the material from the oil and thereafter releasing the partial vacuum.

9. A method as in claim 8 in which the temperature of the oil for further removal of moisture is of the order of from 170 to 230° F.

10. In a method for the dehydration of moist food materials of cellular structure, the steps of introducing a predetermined charge of frozen food material into an evacuated space and thereafter causing the same to be enveloped in a body of hot oil in said space at an initial elevated temperature within the range of from 240 to 600° F., thereby creating a hot vapor-oil mixture of greatly expanded volume which envelops the food material while it is being maintained under partial vacuum, the oil temperature dropping rapidly to a level of the order of 130 to 230° F. immediately following initial contact of the material with the oil, separating the material from the oil and thereafter releasing the vacuum.

11. A method as in claim 10 in which after being treated in said vapor-oil mixture, further moisture is removed from the material by immersing it in hot oil under partial vacuum at a temperature level within the range of from 130 to 230° F. before separating the material from the free oil and without releasing the vacuum.

12. A method as in claim 10 in which the charge is progressively dropped into the hot oil to cause the same to be enveloped therein.

13. In a method for the dehydration of moist food materials of cellular structure, the steps of freezing a moist food material in particles of predetermined size, subjecting a body of oil at a temperature level within the range of from 240 to 600° F. to a partial vacuum, enveloping frozen food material in the body of hot oil at the initial elevated temperature while maintaining the partial vacuum, the amount of frozen material being from 4 to 30 pounds for each 100 pounds of oil, the enveloping of the material in the oil causing rapid transfer of heat to the moist material from the oil with rapid evaporation of moisture to create a violently agitated vapor-oil mixture having a volume many times greater than the original body of oil which envelops the material and causes the temperature of the oil in said vapor-oil mixture rapidly to drop to a lower value within the range of from 130 to 230° F., said drop in temperature occurring over a period of the order of 1 to 4 minutes during which the major part of the moisture of the material is removed, said vapor-oil mixture subsiding at the end of said period, thereafter continuing immersion of the material in hot oil under partial vacuum within a temperature range of from 130 to 230° F., thereby reducing the moisture content of the material to a desired value no higher than about 5%, then separating the material from free oil and thereafter releasing the partial vacuum, the over all time of dehydration ranging from about 7 to 40 minutes.

14. A method as in claim 13 in which free oil is removed at the end of the cycle by subjecting the material to centrifugal force while partial vacuum is maintained.

15. A method as in claim 13 in which the initial oil temperature is within a range of from 325 to 440° F., and in which the lower temperature range is from about 170 to 230° F.

References Cited by the Examiner

UNITED STATES PATENTS

| 1,861,307 | 5/1932 | Gernhardt | 99—239 |
| 1,929,691 | 10/1933 | Hutteman | 99—204 X |
| 2,110,184 | 3/1938 | Webb | 99—204 |
| 2,355,394 | 8/1944 | Ross | 99—207 |
| 2,473,184 | 6/1949 | Webb | 99—204 |
| 2,502,115 | 3/1950 | Zimmerman | 99—208 |
| 2,549,743 | 4/1951 | Zimmerman | 99—208 |
| 2,587,939 | 3/1952 | Webb | 99—239 |
| 2,704,260 | 3/1955 | Heisler | 99—207 |
| 2,712,698 | 7/1955 | Webb | 34—9 |
| 2,813,796 | 11/1957 | Keneaster | 99—204 |
| 2,929,150 | 3/1960 | Johnston | 99—204 X |

FOREIGN PATENTS 617,304  8/1935  Germany.

OTHER REFERENCES

Rolfe: "An Improved Method for Dehydrating Meat," Food, vol. 25, pp. 199–205 (1956).

Vere-Jones: "A New Zealand Process for Dehydrating Meat," part I, Food, vol. 26, pp. 294–298 (1957) and part II, Food, vol. 26, pp. 337–339 (1957).

A. LOUIS MONACELL, *Primary Examiner.*

ABRAHAM H. WINKELSTEIN, *Examiner.*

G. N. MANN, R. S. AULL, *Assistant Examiners.*